(12) United States Patent
Horiuchi et al.

(10) Patent No.: US 8,122,151 B2
(45) Date of Patent: *Feb. 21, 2012

(54) STORAGE SYSTEM FOR OPTIMALLY CONTROLLING A PLURALITY OF DATA TRANSFER PATHS AND METHOD THEREFOR

(75) Inventors: Takeshi Horiuchi, Yokohama (JP); Hitoshi Ooyama, Odawara (JP); Akifumi Yanagawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 457 days.

This patent is subject to a terminal disclaimer.

(21) Appl. No.: 12/374,857

(22) PCT Filed: Dec. 26, 2008

(86) PCT No.: PCT/JP2008/073956
§ 371 (c)(1),
(2), (4) Date: Jan. 23, 2009

(87) PCT Pub. No.: WO2010/073414
PCT Pub. Date: Jul. 1, 2010

(65) Prior Publication Data
US 2011/0161520 A1    Jun. 30, 2011

(51) Int. Cl.
*G06F 15/173* (2006.01)
(52) U.S. Cl. ......... 709/244; 709/223; 709/224; 709/232
(58) Field of Classification Search ................ 709/203, 709/212, 216, 217, 219, 223, 224, 232, 238, 709/244
See application file for complete search history.

(56) References Cited

U.S. PATENT DOCUMENTS

| 7,380,019 | B2 * | 5/2008 | Shiga et al. | 709/239 |
|---|---|---|---|---|
| 2002/0138642 | A1 * | 9/2002 | Miyazawa et al. | 709/232 |
| 2003/0185064 | A1 | 10/2003 | Hirakawa et al. | |
| 2003/0187945 | A1 * | 10/2003 | Lubbers et al. | 709/213 |

(Continued)

FOREIGN PATENT DOCUMENTS
EP    1 351 143    10/2003
(Continued)

OTHER PUBLICATIONS

International Search Report for PCT/JP2008/073956, dated Sep. 8, 2009 (4 pages); Transmittal of ISR Form PCT/ISA/220 (3 pages); and Written Opinion (8 pages).

*Primary Examiner* — Barbara Burgess
(74) *Attorney, Agent, or Firm* — Antonelli, Terry, Stout & Kraus, LLP.

(57) ABSTRACT

Provided is a storage system, which includes: a storage medium for storing data; a plurality of ports for connection to a network; and a control section, and in which: the network is connected to another storage system; the plurality of ports include a first port; the plurality of ports involve a plurality of data transfer paths extending from the plurality of ports to the another storage system, which include a first data transfer path extending from the first port to the another storage system; and the control section: transmits data to be stored into the another storage system from the plurality of ports; acquires performances of the plurality of data transfer paths; and transmits, if the performance of the first data transfer path is lower than a predetermined threshold value, the data to be stored into the another storage system from the plurality of ports excluding the first port.

10 Claims, 22 Drawing Sheets

U.S. PATENT DOCUMENTS

| | | |
|---|---|---|
| 2003/0229764 A1 | 12/2003 | Ohno et al. |
| 2005/0071393 A1 | 3/2005 | Ohno et al. |
| 2005/0198276 A1* | 9/2005 | Shiga et al. .................. 709/224 |
| 2005/0267986 A1* | 12/2005 | Murakami et al. ............ 709/238 |
| 2007/0043854 A1* | 2/2007 | Shum et al. ................... 709/224 |
| 2008/0126548 A1 | 5/2008 | Moore et al. |

FOREIGN PATENT DOCUMENTS

| | | |
|---|---|---|
| JP | 2004-013367 | 1/2004 |
| WO | WO 01/82079 | 11/2001 |

* cited by examiner

Fig. 5

COMMUNICATION RATE MANAGEMENT TABLE

| PORT INFORMATION | PATH STATUS | TRANSFER RATIO |
|---|---|---|
| PORT A | VALID | Sa |
| PORT B | INVALID | Sb |

START OF PAIR FORMATION

601 — START OPERATION OF COMMUNICATION RATE MONITORING FUNCTION
EXECUTE DATA TRANSFER

602 — END OF PAIR FORMATION

STORAGE SYSTEM FOR OPTIMALLY CONTROLLING A PLURALITY OF DATA TRANSFER PATHS AND METHOD THEREFOR

TECHNICAL FIELD

This invention relates to a technology for a storage system for storing data according to an instruction from a computer, in particular, a technology for controlling data transfer paths between storage systems.

BACKGROUND ART

In order to protect data stored in a storage system against data loss attributable to a disaster or the like, a so-called remote copy technology is used. According to the remote copy technology, a copy of data stored in a logical volume of a primary storage system (hereinafter, referred to as "primary logical volume") is stored also in a logical volume of a secondary storage system (hereinafter, referred to as "secondary logical volume"). Data is thus made redundant, and hence, even if data stored in one logical volume is lost due to a disaster or the like, it is possible to resume a task by using data stored in another logical volume (see, for example, JP 2004-13367 A).

DISCLOSURE OF THE INVENTION

In order to realize such redundancy in the data, a copy of data stored in a primary logical volume is transferred from a primary storage system to a secondary storage system. For the transfer, a plurality of the transfer paths may be used in parallel. For example, the data to transferred is divided into predetermined transfer units (for example, packets), and the transfer units are each allocated to a plurality of transfer paths in a round robin manner. Such redundancy in the transfer path allows improvements in failure resistance and transfer rate.

In a case where the above-mentioned remote copy is executed, an order of data updates performed in the primary logical volume needs to be reflected also onto the secondary logical volume. In other words, a copy of data written in the primary logical volume needs to be written into the secondary logical volume in the same order as when the original data are written into the primary logical volume. Therefore, even if the plurality of transfer paths are used in a round robin manner as described above, the data received from the plurality of transfer paths by the secondary storage system are written into the secondary logical volume in the same order as when the original data are written into the primary logical volume.

However, the transfer rates of the plurality of transfer paths are not always even. For example, the transfer rate of one of the transfer paths may become lower than the transfer rates of the other transfer paths due to a congestion of traffic on a network through which the transfer path passes, a failure occurring in a device through which the transfer path passes, and other such cause. In this case, the transfer rates of the other transfer paths also become lower in order to maintain the order in which the units of data are written into the secondary logical volume. As a result, there is a case where such an effect is not produced that the transfer rate is improved by using the plurality of transfer paths.

This invention has been made in view of the above-mentioned problem, and an object thereof is to control transfer paths so as to prevent the lowered transfer rate of one transfer path from affecting the transfer rates of the other transfer paths.

A representative example of this invention is as follows. That is, there is provided a storage system, which includes: a storage medium for storing data; a plurality of ports for connection to a network; and a control section for controlling input/output of data to/from the storage medium and transmission/reception of data via the plurality of ports, and in which: the network is connected to another storage system; the network includes a plurality of data transfer paths extending from the plurality of ports to the another storage system; the plurality of ports include a first port; the plurality of data transfer paths include a first data transfer path extending from the first port to the another storage system; and the control section is configured to: transmit data to be stored into the another storage system from the plurality of ports; acquire performances of the plurality of data transfer paths; and transmit, if the performance of the first data transfer path is lower than a predetermined threshold value, the data to be stored into the another storage system from the plurality of ports excluding the first port.

According to an exemplary embodiment of this invention, by stopping the use of a transfer path having a transfer rate lower than a predetermined threshold value, it is possible to prevent whole transfer rates of the plurality of transfer paths from being lowered.

BRIEF DESCRIPTION OF THE DRAWINGS

FIG. 5 is an explanatory diagram of a communication rate management table according to the first embodiment of this invention.

FIG. 6 is a flowchart showing a pair formation processing executed in the first embodiment of this invention.

BEST MODE FOR CARRYING OUT THE INVENTION

First Embodiment

Figure 1:
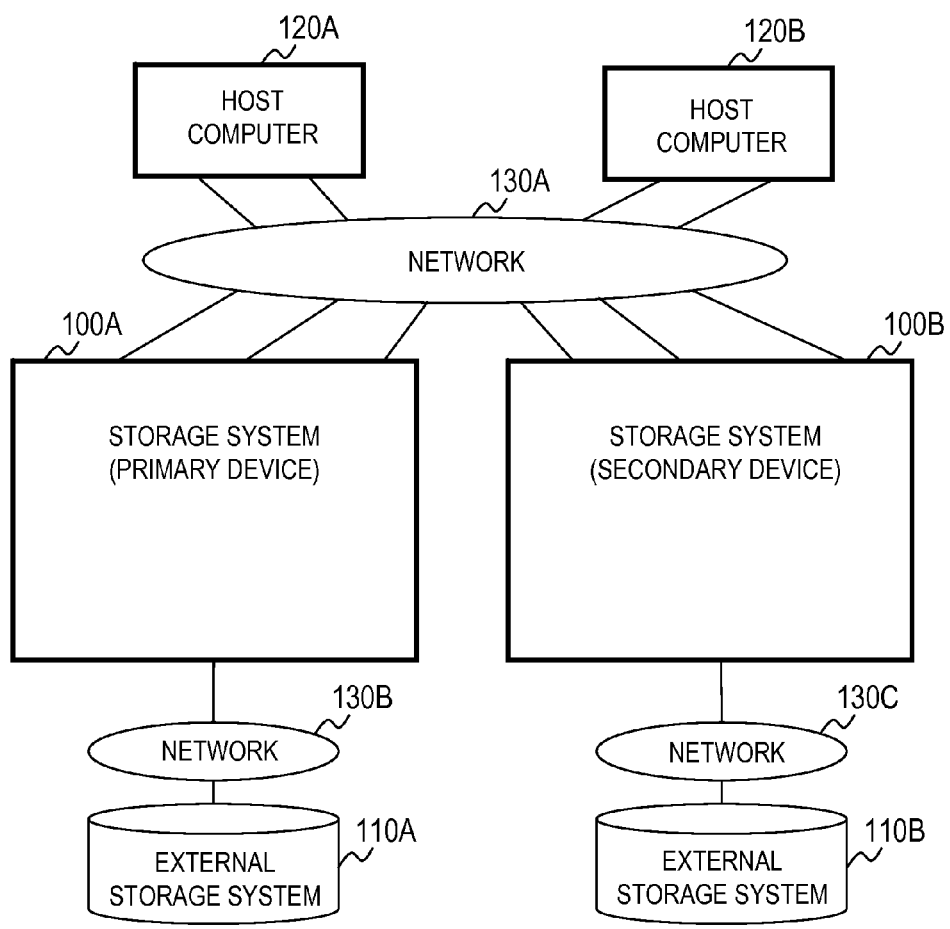
FIG. 1 is a block diagram showing a configuration of a computer system according to a first embodiment of this invention.

FIG. 1 is a block diagram showing a configuration of a computer system according to a first embodiment of this invention.

The computer system of this embodiment includes a plurality of storage systems 100 and at least one host computer 120. FIG. 1 shows storage systems 100A and 100B as the plurality of storage systems 100, and host computers 120A and 120B as the at least one host computer 120. Hereinafter, the storage systems 100A and 100B will also be referred to generically as a storage system 100 for common description thereof. The host computers 120A and 120B will also be referred to generically as a host computer 120 for common description thereof.

The storage system 100 is connected to the host computer 120 via a network 130A.

The storage system 100 may be further connected to an external storage system 110 via a network. In the example of FIG. 1, the storage system 100A is connected to an external storage system 110A via a network 130B, while the storage system 100B is connected to an external storage system 110B via a network 130C. Hereinafter, the external storage systems 110A and 110B will also be referred to generically as the external storage system 110 for common description thereof. The external storage system 110 will be described in detail according to a second embodiment of this invention.

The networks 130A, 130B, and 130C may be any kinds of network. For example, the network 130A may be a network to which a fibre channel (FC) protocol is applied, or may be a network to which an Internet protocol (IP) is applied.

As shown in FIG. 1, the networks 130A, 130B, and 130C may be independent of each other. In this case, the networks 130A, 130B, and 130C may be of the same kind or may be of different kinds from each other. Hereinafter, the networks 130A, 130B, and 130C will also be referred to generically as a network 130 for common description thereof.

Alternatively, the networks 130A, 130B, and 130C may constitute parts of one network. In this case, the one network including the networks 130A, 130B, and 130C will be referred to as the network 130.

Figure 2:
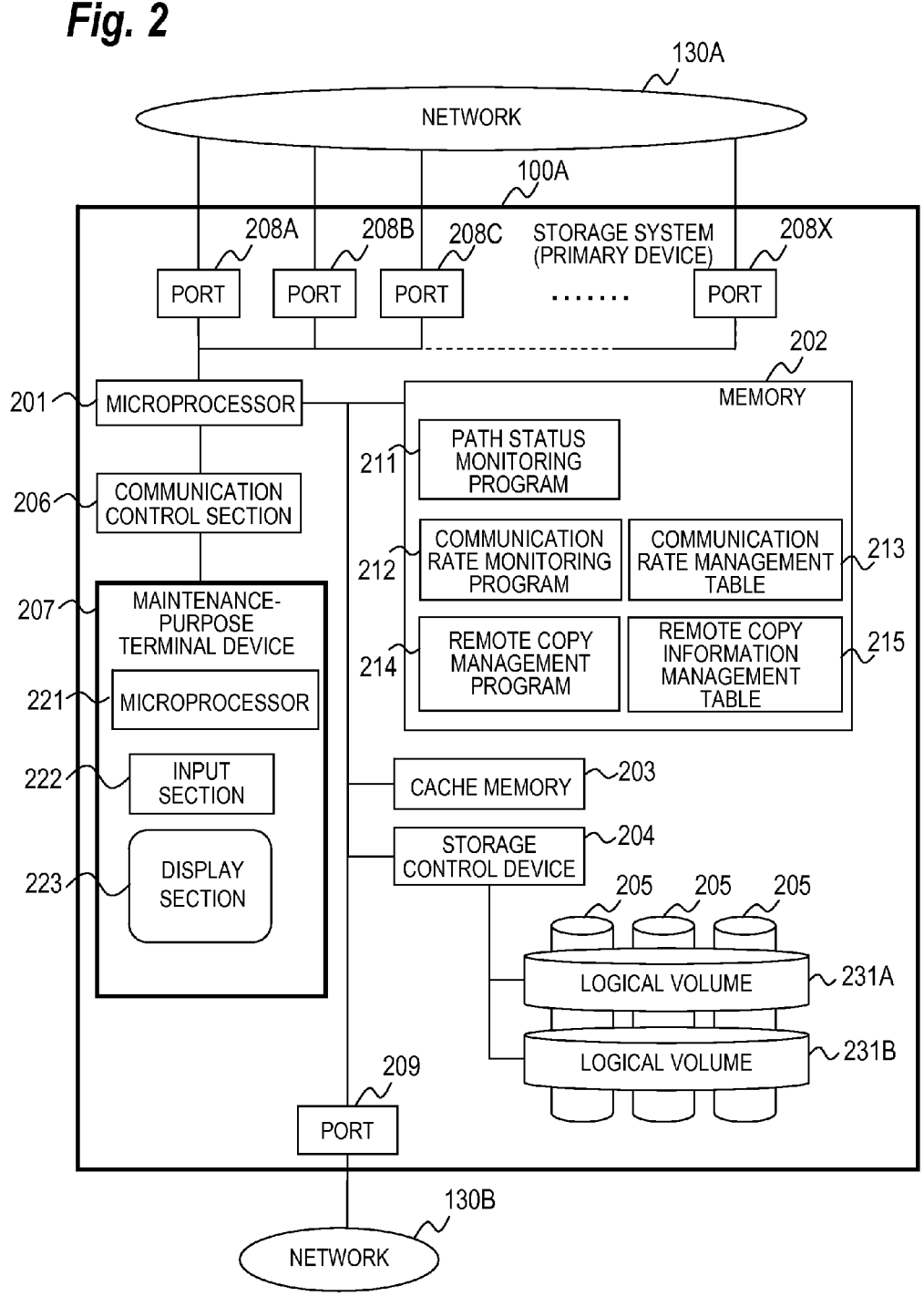
FIG. 2 is a block diagram showing a configuration of a storage system according to the first embodiment of this invention.

FIG. 2 is a block diagram showing a configuration of the storage system 100A according to the first embodiment of this invention.

The storage system 100A includes a microprocessor 201, the memory 202, a cache memory 203, a storage control device 204, a storage device 205, a communication control section 206, a maintenance-purpose terminal device 207, a plurality of ports 208 (in the example of FIG. 2, ports 208A, 208B, 208C, and 208X), and a port 209.

The microprocessor 201 is connected to the memory 202, the cache memory 203, the storage control device 204, the storage device 205, the communication control section 206, the maintenance-purpose terminal device 207, the plurality of ports 208, and the port 209, and controls each of those components. For example, the microprocessor 201 executes a program stored in the memory 202 to thereby control input/output of data to/from the storage device 205, transmission/reception of data via the ports 208, and the like.

FIG. 2 shows only one microprocessor 201, but the storage system 100A may include a plurality of microprocessors 201. In this case, each of the microprocessors 201 may be connected to one or a plurality of ports 208.

The memory 202 is, for example, a semiconductor memory. Stored in the memory 202 are programs executed by the microprocessor 201 and data referenced by the microprocessor 201.

In the example of FIG. 2, the memory 202 stores therein a path status monitoring program 211, a communication rate monitoring program 212, a communication rate management table 213, a remote copy management program 214, and a remote copy information management table 215. In the following description, processings executed by the storage system 100A are realized by the microprocessor 201 executing the programs stored in the memory 202 in actuality.

The cache memory 203 is, for example, a semiconductor memory, and temporarily stores therein data to be written into the storage device 205 and data read from the storage device 205. This covers an access time for access to the storage device 205, and hence a response time required by the storage system 100A with respect to a request to input/output data to/from the host computer 120 (in other words, data write request or data read request) is reduced.

The storage control device 204 controls the input/output of data to/from the storage device 205 under the control of the microprocessor 201.

The storage device 205 is a device provided with the storage medium for storing data. The storage device 205 may be, for example, a disk drive such as a hard disk drive (HDD), or a semiconductor memory device such as a flash memory. A plurality of storage devices 205 may constitute a redundant arrays of inexpensive disks (RAID) structure.

A storage area provided by the storage medium of the storage device 205 is managed as a logical volume 231 (in the example of FIG. 2, logical volumes 231A and 231B). For example, the storage area of one storage device 205 may be managed as one logical volume 231, or a part of the storage area of one or a plurality of storage devices 205 may be managed as one logical volume 231. The storage system 100A causes the host computer 120 to recognize the one logical volume 231 as one logical storage device.

Figure 4:
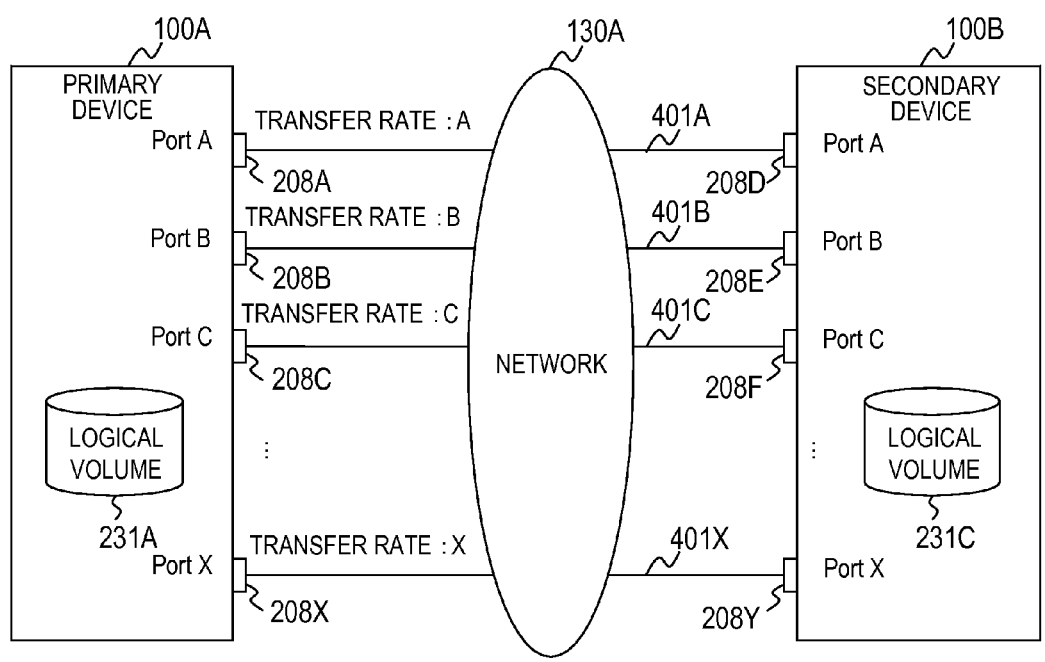
FIG. 4 is an explanatory diagram of data transfer paths between the storage systems according to the first embodiment of this invention.

FIG. 2 shows an example of providing the logical volumes 231A and 231B. Hereinafter, the logical volumes 231A and 231B will also be referred to generically as the logical volume 231 for common description thereof. The same holds true of a logical volume 231C and the like, which will be described later as shown in FIG. 4.

The storage system 100A can define an arbitrary number of logical volumes 231. In addition, the storage system 100A can arbitrarily define a size (storage capacity) of each logical volume 231.

The communication control section 206 controls communications performed between the microprocessor 201 and the maintenance-purpose terminal device 207.

The maintenance-purpose terminal device 207 is a computer used for maintenance of the storage system 100A. The maintenance-purpose terminal device 207 includes a microprocessor 221, an input section 222, and a display section 223.

The microprocessor 221 executes, for example, a maintenance-purpose program (not shown) to thereby transmit the control signal for maintenance of the storage system 100A to the microprocessor 201 via the communication control section 206. The input section 222 is, for example, a keyboard or a mouse for receiving an input from a user or an administrator of the storage system 100A. The display section 223 is, for example, an image display device for displaying information for the user or the administrator of the storage system 100A.

The user or the administrator of the storage system 100A can operate the maintenance-purpose terminal device 207 to thereby, for example, execute start of the storage system 100A, modification of its configurations, stop thereof, and the like.

The ports 208A, 208B, 208C, and 208X are connected to the network 130A, and used for communications performed between the storage system 100A and the host computer 120 or the storage system 100B. Hereinafter, the ports 208A, 208B, 208C, and 208X will also be referred to generically as the port 208 for common description thereof. The same holds true of a port 208D and the like, which will be described later.

FIG. 2 shows 4 ports 208, but the storage system 100A may be provided with any number of ports 208.

The port 209 is connected to the network 130B, and used for communications performed between the storage system 100A and the external storage system 110A. The port 209 may be of the same kind as the port 208.

It should be noted that such a configuration of the storage system 100A as described above is one simplified for a brief description. In an actual storage system, for example, the port 208 and the microprocessor 201 may be implemented as a so-called channel adapter (CHA). In a case where a plurality of channel adapters are provided, the memory 202 may be implemented as a shared memory that is shared by a plurality of microprocessors 201. The storage control device 204 may be implemented as a so-called disk adapter (DKA).

Since a configuration of the storage system 100B is similar to the configuration of the storage system 100A, illustration and description thereof are omitted. However, in the following description, the ports 208 included in the storage system 100B are also referred to as the ports 208D, 208E, 208F, and 208Y. As shown in FIG. 4, the logical volume 231 defined in the storage system 100B is also referred to as the logical volume 231C.

Figure 3:
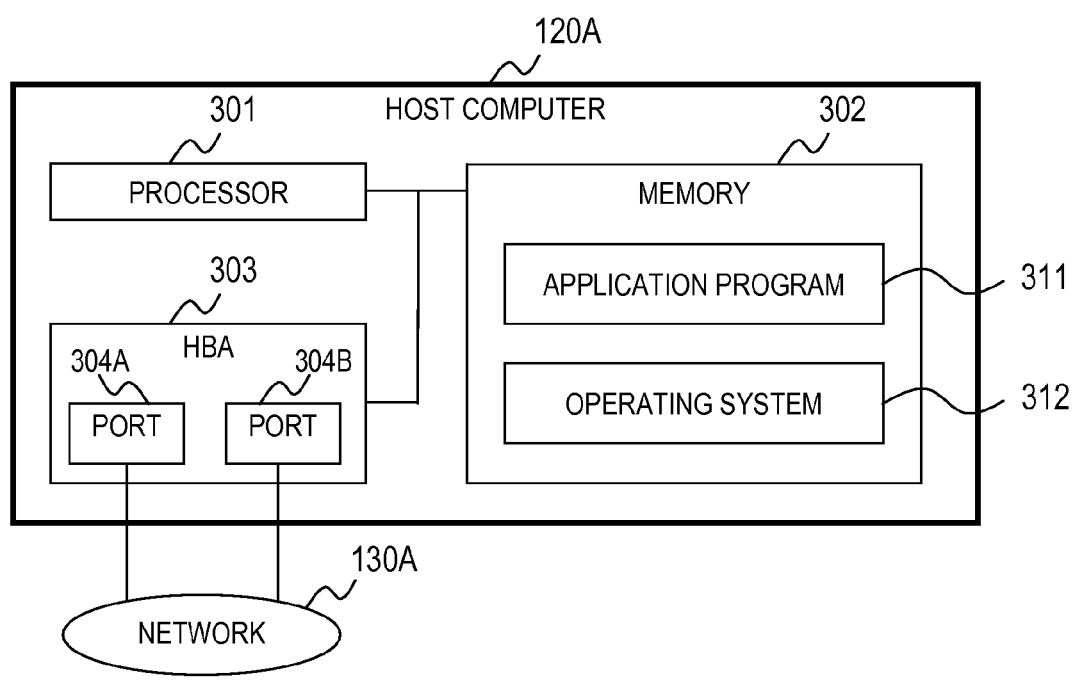
FIG. 3 is a block diagram showing a configuration of a host computer according to the first embodiment of this invention.

FIG. 3 is a block diagram showing a configuration of the host computer 120A according to the first embodiment of this invention.

The host computer 120A includes a processor 301, a memory 302, and a host bus adapter 303 that are connected to one another.

The processor 301 executes programs stored in the memory 302.

Stored in the memory 302 are the programs executed by the processor 301 and data referenced by the processor 301. In the example of FIG. 3, the memory 302 stores therein an operating system 312 and an application program 311 executed thereon.

The application program 311 may be of any kind. A user of the host computer 120A can install the application program 311 for realizing a predetermined function (for example, database function) onto the host computer 120A and execute the application program 311. As necessary, the application program 311 transmits, to the storage system 100, a data write request and a data read request with respect to the logical volume 231.

The host bus adapter (HBA) 303 executes communications with the storage system 100 via the network 130A. The HBA 303 includes one or more ports 304 (in the example of FIG. 3, ports 304A and 304B) that are connected to the network 130A.

Since a configuration of the host computer 120B is similar to the configuration of the host computer 120A, illustration and description thereof are omitted.

FIG. 4 is an explanatory diagram of data transfer paths between the storage systems 100 according to the first embodiment of this invention.

In this embodiment, a data transfer path (hereinafter, referred to simply as "path") 401A is set between the port 208A of the storage system 100A and the port 208D of the storage system 100B. In the same manner, a path 401B is set between the port 208B and the port 208E, a path 401C is set between the port 208C and the port 208F, and a path 401X is set between the port 208x and the port 208Y. Hereinafter, the paths 401A, 401B, 401C, and 401X will also be referred to generically as a path 401 for common description thereof. It should be noted that an arbitrary number of paths 401 can be set in actuality.

The storage system 100A can transfer data to the storage system 100B via those paths 401. In this embodiment, in order to execute so-called remote copy, data is transferred from the storage system 100A to the storage system 100B. Here, the remote copy is described.

The description will be made by taking an example case of defining a pair for the remote copy (hereinafter, referred to as "copy pair") constituted of the logical volume 231A of the storage system 100A and the logical volume 231C of the storage system 100B with the logical volume 231A as a primary logical volume and the logical volume 231C as a secondary logical volume. It should be noted that such information for defining a copy pair is registered in the remote copy information management table 215. As shown in FIG. 1 and the like, the storage system 100A including the primary logical volume is also referred to as a primary device. The storage system 100B including the secondary logical volume is also referred to as a secondary device.

In this case, upon reception of a request to write data from the host computer 120 to the logical volume 231A, the storage system 100A stores the requested data into the logical volume 231A. In actuality, the data may be stored temporarily in the cache memory 203, but the data is finally stored in the logical volume 231A.

Further, the storage system 100A copies the data stored in the logical volume 231A, and transmits the copied data to the storage system 100B via the path 401.

The storage system 100B stores the data received from the storage system 100A into the logical volume 231C. In the same manner as the case with the logical volume 231A, in actuality, the data may be stored temporarily in the cache memory 203 of the storage system 100B. When the storage system 100B finishes storing the data into the logical volume 231C (or the cache memory 203 of the storage system 100B), the storage system 100B returns a response (Acknowledgement) to the storage system 100A.

After the storage system 100A finishes storing the data into the logical volume 231A (or cache memory 203 of storage system 100A), the storage system 100A returns a response to the host computer 120. The storage system 100A may control a timing for the response in order to prevent the response from being transmitted to the host computer 120 before the response is received from the storage system 100B. The remote copy involving such control is called "synchronous remote copy".

Alternatively, after the storage system 100A finishes storing the data into the logical volume 231A (or cache memory 203 of storage system 100A), the storage system 100A may transmit the response to the host computer 120 regardless of whether or not the response has been received from the storage system 100B. The remote copy involving such control is called "asynchronous remote copy".

A plurality of paths 401 may be used as the data transfer path for such remote copy as described above. By using the plurality of paths 401, improvements in failure resistance and transfer rate are expected. In this case, the plurality of paths 401 are generally used in a so-called round robin manner. For example, the copy of the data stored in the logical volume 231A may be transmitted to the storage system 100B via the paths 401A and 401B. In this case, the data to be transferred is divided into a predetermined (or arbitrary) size of transfer units (for example, packets), and transfer units are transmitted via the paths 401A and 401B alternately.

Meanwhile, in order to maintain consistency of data stored in the secondary logical volume, it is necessary to guarantee an order in which the data are stored into the secondary logical volume. Specifically, in the example of FIG. 4, in a case where a plurality of data are stored into the logical volume 231A in a given order, copies of those data need to be stored into the logical volume 231C in the same order as the given order.

However, in the case where the plurality of paths 401 are used as described above, the transfer rates of all of the paths 401 are not always the same. For example, there may be a case where only the transfer rate of a particular path is lowered due to a contact failure in a connector, a failure in a cable, a line congestion, or the like. If arrival of a transfer unit from one of the paths 401 is delayed due to such a cause, transfer units to be stored after the delayed transfer unit cannot be stored into the secondary logical volume until the delayed transfer unit arrives.

The fact has such a meaning that the lowered transfer rate of one of the paths 401 also lowers the transfer rates of the other paths 401. As a result, an advantage of using the plurality of paths 401 may be lost. Processings executed for solving such a problem will be described in detail hereinbelow.

Here, description is made of the transfer rate of the path 401.

Any kinds of index may be used as the transfer rate of the path 401, and in general, a response time or a throughput (in other words, data transfer amount per unit time) is used. The conventional storage system generally allows measurement of the response time and the throughput to be performed on each port. The storage system 100 of this embodiment uses the same function as the conventional one to measure the response time and the throughput of each of the ports 208.

Hereinafter, this embodiment will be described by taking an example where the response time is used as the transfer rate, while in actuality, the throughput may be used instead. However, as described later with reference to Step 808 of FIG. 8, there may be a case where a data amount transmitted from each of the paths 401 is controlled according to the transfer rate. In this case, data amounts allocated to each of the paths 401 are not even, and hence it is not possible to accurately compare transfer performances of the respective paths 401 by using the throughput. Therefore, it is desirable to use the response time as the transfer rate in such a case.

FIG. 4 shows an example where response times A (ms), B (ms), C (ms), and X (ms) are measured as the transfer rates of the path 401A, 401B, 401C, and 401X, respectively.

For example, the storage system 100A transmits a request to write data from the port 208A to the logical volume 231C, and upon reception of the response thereto, can measure a time that elapses from the transmission of the request until the reception of the response as the response time. However, the response time measured as described above includes a time required for the storage system 100B that has received a write request to write data into the logical volume 231C (in actuality, cache memory 203 of storage system 100B). Such a cache write time is irrelevant to the transfer rate of the path 401. Therefore, it is desirable to use the response time excluding the cache write time as the index of the transfer rate.

Therefore, in a case where the storage system 100B has a function of measuring the cache write time and subtracting the cache write time from the response time, it is desirable to use this function to calculate the response time excluding the cache write time and use the calculated response time as the transfer rate. For example, the storage system 100B may include information indicating the cache write time within the response to be transmitted to the storage system 100A. In this case, the storage system 100A receiving the response can subtract the cache write time from the response time.

In a case where the storage system 100B does not have such a function, the response time including the cache write time may be used as an approximate transfer rate. Alternatively, the storage system 100B may estimate the cache write time. A specific example of the method will be described later (see a second embodiment).

FIG. 5 is an explanatory diagram of the communication rate management table 213 according to the first embodiment of this invention.

The communication rate management table 213 is created for each copy pair, and is stored in the memory 202. FIG. 5 shows an example of the communication rate management table 213 that is stored in the memory 202 of the storage system 100A and corresponds to a copy pair constituted of the logical volumes 231A and 231C.

Further, for a brief description, FIG. 5 shows an example where only two of the paths 401, in other words, the path 401A and 401B are allocated to the copy pair constituted of the logical volumes 231A and 231C. In this case, in a normal state, the transfer unit including the copies of the data units stored in the logical volume 231A are transmitted via the paths 401A and 401B alternately. In actuality, more of the paths 401 may be used for transferring the data.

The communication rate management table 213 includes port information 501, a path status 502, and a transfer ratio 503.

The port information 501 is an identifier of the port 208 connected to the path 401 allocated to the copy pair. In the example of FIG. 5, "Port A" and "Port B" are registered as the port information 501. As shown in FIG. 4, those are identifiers of the port 208A connected to the path 401A and the port 208B connected to the path 401B, respectively.

The path status 502 is information indicating a status of each of the paths 401. Specifically, one of values "valid" and "invalid" is registered as the path status 502. The value "valid" indicates that the path 401 is used for data transfer, while the value "invalid" indicates that the path 401 is not used for data transfer. In a normal state, all of the paths 401 have the value "valid" registered as the path status 502, but as described later, the path status 502 of the path 401 that satisfies a predetermined condition is changed to "invalid".

In the example of FIG. 5, the value "valid" is registered as the path status 502 corresponding to "Port A". This indicates that the path 401A is used for data transfer performed from the logical volume 231A to the logical volume 231C. Meanwhile, the value "invalid" is registered as the path status 502 corresponding to "Port B". In this case, the path 401B is allocated for the data transfer performed from the logical volume 231A to the logical volume 231C, but is not used for the data transfer until the value of the path status 502 corresponding thereto is changed to "valid". A procedure for changing the path status 502 will be described later.

The transfer ratio 503 is a ratio calculated based on the transfer rate of each path 401. This ratio indicates how high (or low) the transfer rate of one of the plurality of paths 401 that is allocated to one copy pair is in comparison with a mean value of the transfer rates of the plurality of paths 401. For example, the value "Sa" of the transfer ratio 503 of the path 401A may be calculated by Expression (1).

$$Sa=(A+B)/(2\times A) \quad (1)$$

It should be noted that in a case where, as shown in FIG. 4, the N paths 401 from the path 401A through the path 401X are allocated to one copy pair, the above-mentioned Expression (1) becomes Expression (2) as follows.

$$Sa=(A+B+C+\ldots+X)/(N\times A) \quad (2)$$

The value "Sb" of the transfer ratio 503 of the path 401B and the values of the transfer ratios 503 of the other paths 401 are calculated in a similar manner.

In the case where the transfer rates A, B, and the like are defined as the response time, the transfer rates are higher as their values are smaller (in other words, the transfer performances are higher). Therefore, as the value Sa calculated by the above-mentioned expression is larger, the transfer performance of the path 401A is higher (more accurately, a proportion of the transfer performance of the path 401A to a mean value of the transfer performances of the plurality of paths 401 is larger).

On the other hand, in the case where the transfer rates A, B, and the like are defined as the throughput, the transfer rates are higher as their values are larger (in other words, the transfer performances are higher). In this case, the inverse number of the value calculated by the above-mentioned Expressions (1) and (2) may be used as the transfer ratio Sa or the like. In this case, as the value Sa is larger, the transfer performance of the path 401A is higher (more accurately, the proportion of the transfer performance of the path 401A to the mean value of the transfer performances of the plurality of paths 401 is larger).

Next, control performed on the data transfer using the plurality of paths 401 will be described by referring to flowcharts. The following description is also made by taking the example where the copy pair are constituted of the logical volumes 231A and 231C.

FIG. 6 is a flowchart showing a pair formation processing executed in the first embodiment of this invention.

Figure 7:
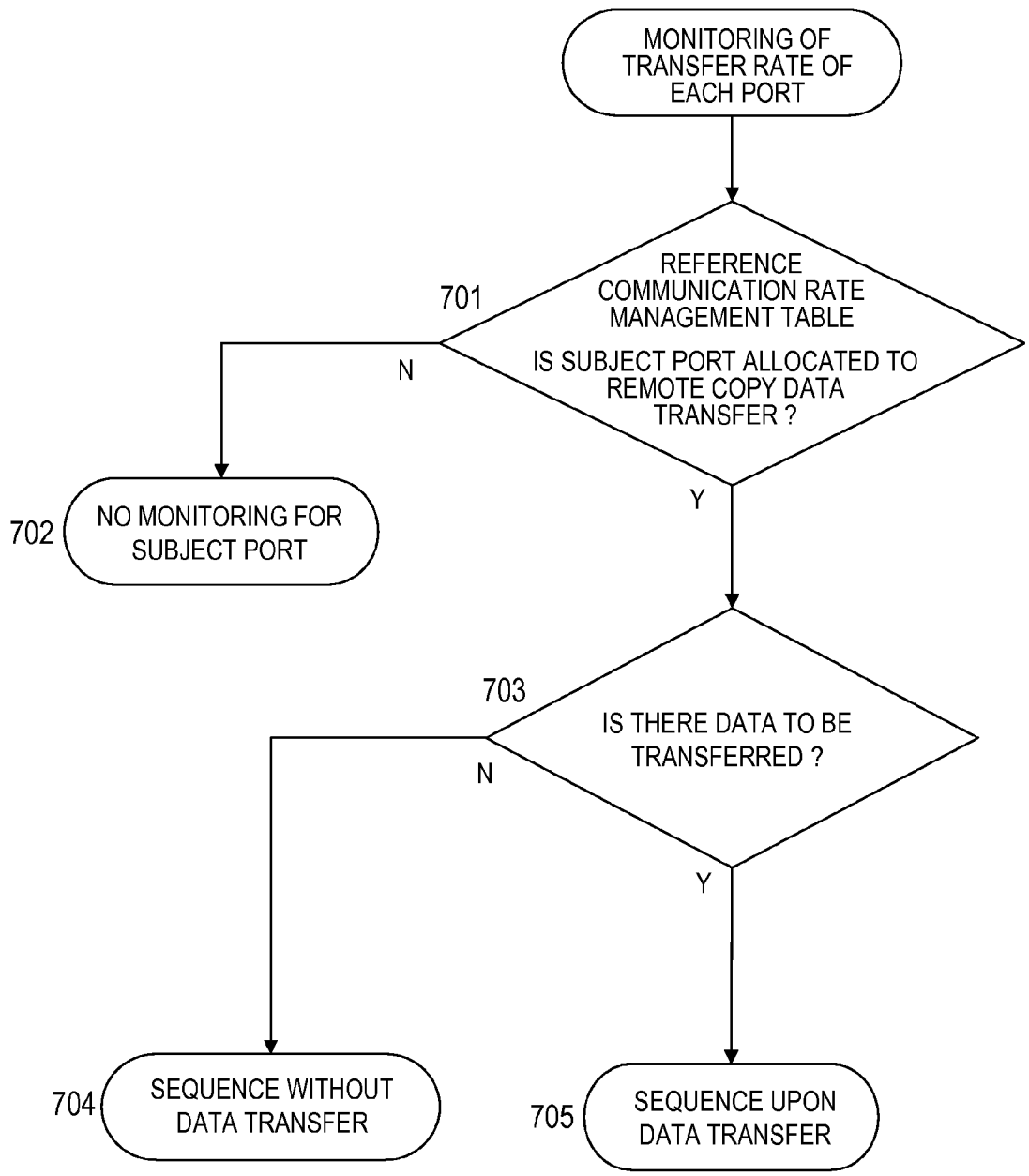
FIG. 7 is a flowchart showing a transfer rate monitoring processing executed on each of ports in the first embodiment of this invention.

When a processing of forming the copy pair constituted of the logical volumes 231A and 231C, the primary device (in other words, storage system 100A) starts an operation of a communication rate monitoring function (Step 601). Specifically, the microprocessor 201 of the storage system 100A may start execution of the communication rate monitoring program 212 in Step 601. The detailed processing of communication rate monitoring will be described later as shown in FIG. 7 and the like.

In Step 601, the storage system 100A further executes an initial copy of the formed copy pair. Specifically, the storage system 100A reads all of data stored in the primary logical volume 231A in order, and transmits the data to the storage system 100B. The storage system 100B stores the data received from the storage system 100A into the secondary logical volume 231C.

It should be noted that in Step 601, information for managing the formed copy pair may be registered into the remote copy information management table 215. For example, if the copy pair constituted of the logical volumes 231A and 231C are formed, an identifier of the primary logical volume 231A, an identifier of the secondary logical volume 231C, and information indicating the kind of the copy pair may be registered. Here, the information indicating the kind of the copy pair is information indicating which of the synchronous remote copy and the asynchronous remote copy is executed on the formed copy pair.

After that, the processing of forming the copy pair is brought to an end (Step 602).

FIG. 7 is a flowchart showing a transfer rate monitoring processing executed on each of the ports 208 in the first embodiment of this invention.

The storage system 100A executes the processing shown in FIG. 7 on each of the paths 401 (in other words, for each of the ports 208 of the storage system 100A that is connected to the each of the paths 401). This processing may be executed at a predetermined timing (for example, periodically). Hereinafter, the path 401 and the port 208 that are subjected to a transfer rate management processing will be referred to as "subject path 401" and "subject port 208", respectively.

First, the storage system 100A references the communication rate management table 213 to judge whether or not the subject port 208 is allocated to data transfer for the remote copy (in other words, whether or not the subject port 208 is allocated to the copy pair) (Step 701). If the subject port 208 is registered as the port information 501 of the communication rate management table 213, it is judged that the subject port 208 is allocated to the data transfer for the remote copy.

If the subject port 208 is not allocated to the data transfer for the remote copy, the storage system 100A does not monitor the transfer rate of the subject port 208 (in other words, transfer rate of subject path 401) (Step 702).

On the other hand, if the subject port 208 is allocated to the data transfer for the remote copy, the storage system 100A judges whether or not there is data to be transferred (Step 703).

Specifically, the copy pair constituted of the logical volumes 231A and 231C are formed, and after the initial copy is executed, if there occurs a data write processing from the host computer 120 to the primary logical volume 231A, the copy of the written data is held in the cache memory 203 as the data to be transferred until the copy is transferred to the storage system 100B. In such a case where the data to be transferred is held in the cache memory 203, it is judged in Step 703 that there is data to be transferred.

Figure 9:
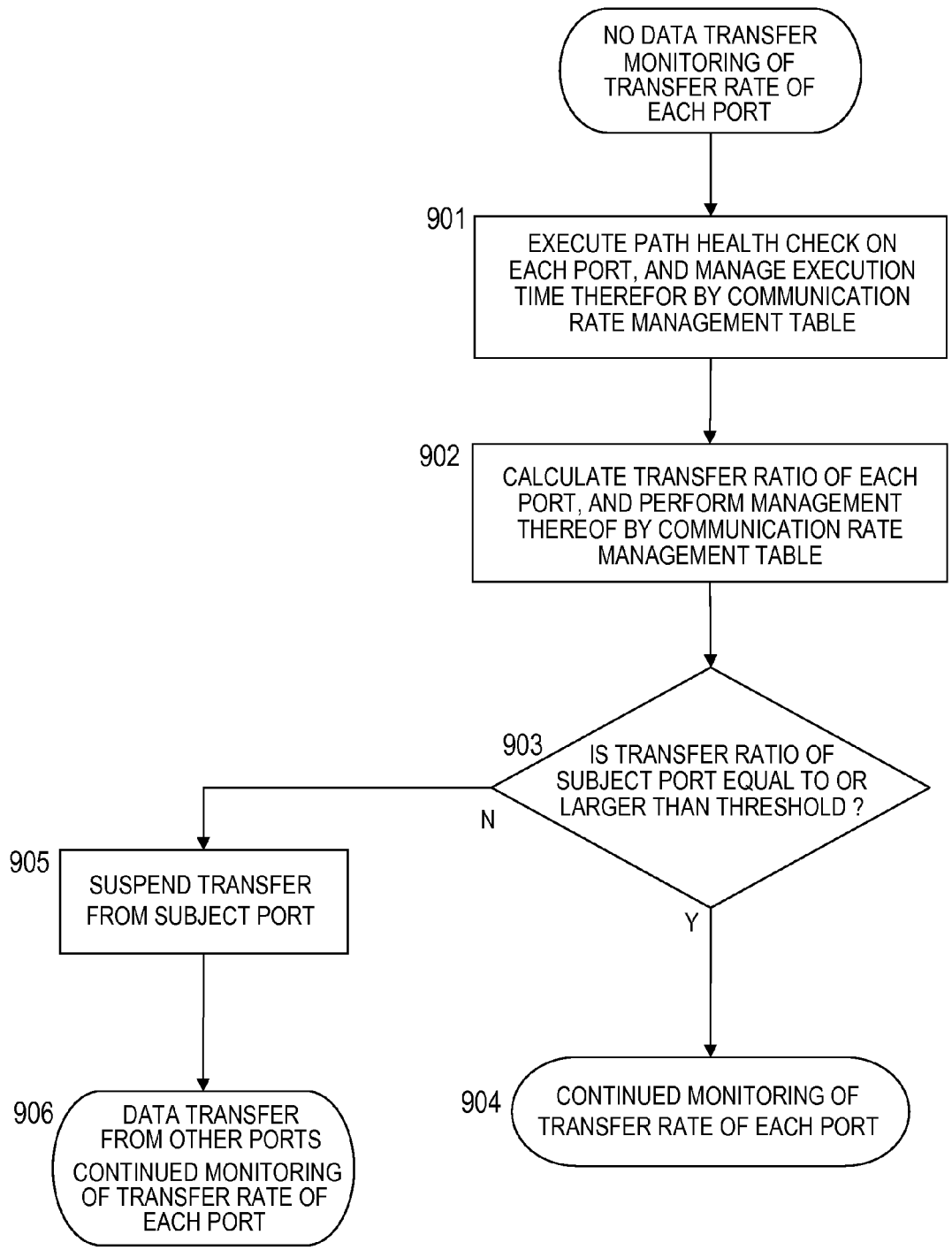
FIG. 9 is a flowchart showing a sequence without data transfer executed in the first embodiment of this invention.

If it is judged in Step 703 that there is no data to be transferred, the storage system 100A executes a sequence without data transfer (Step 704). The sequence without data transfer will be described later as shown in FIG. 9.

On the other hand, if it is judged in Step 703 that there is data to be transferred, the storage system 100A executes a sequence upon data transfer (Step 705). The sequence upon data transfer will be described later as shown in FIG. 8.

Figure 8:
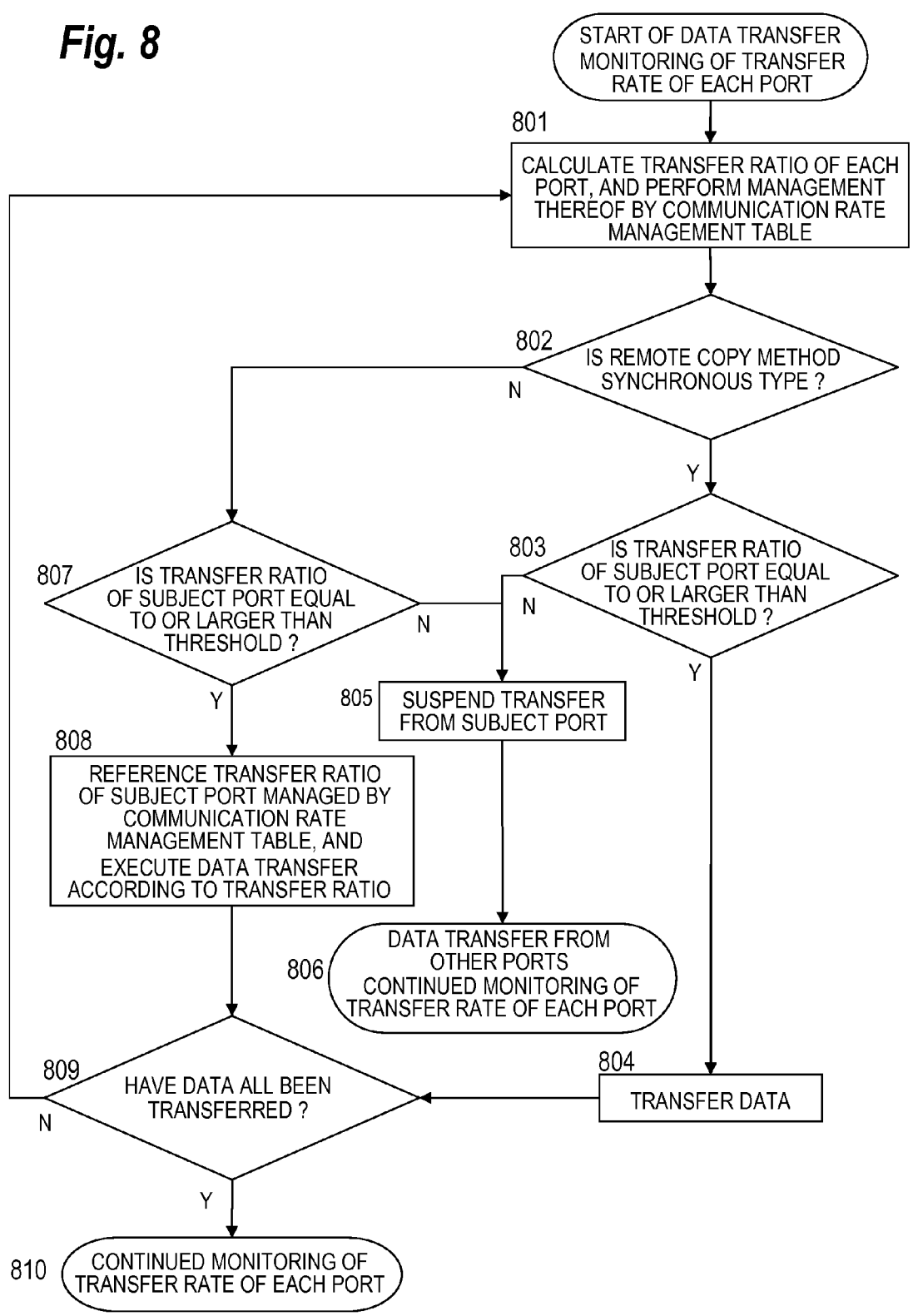
FIG. 8 is a flowchart showing a sequence upon data transfer executed in the first embodiment of this invention.

FIG. 8 is a flowchart showing the sequence upon data transfer executed in the first embodiment of this invention.

The processing shown in FIG. 8 is executed if it is judged in Step 703 of FIG. 7 that there is data to be transferred. In this case, the storage system 100A first calculates the transfer ratio of each of the ports 208 as shown in Expression (1) or (2), and registers the calculated transfer ratio as the transfer ratio 503 of the communication rate management table 213 (Step 801).

Subsequently, the storage system 100A judges whether or not the remote copy method applied to the copy pair is the synchronous remote copy (Step 802).

If it is judged in Step 802 that the synchronous remote copy is applied, the storage system 100A judges whether or not the transfer ratio of the subject port 208 is equal to or larger than a predetermined threshold value (Step 803).

If it is judged in Step 803 that the transfer ratio of the subject port 208 is equal to or larger than the predetermined threshold value, the storage system 100A transfers data from the subject port 208 (Step 804).

On the other hand, if it is judged in Step 803 that the transfer ratio of the subject port 208 is less than the predetermined threshold value, the transfer rate of the subject path 401 connected to the subject port 208 has been lowered enough to cancel the advantage of using the plurality of paths 401. In this case, the storage system 100A suspends the data transfer from the subject port 208 (Step 805). Specifically, the storage system 100A changes the path status 502 of the communication rate management table 213 corresponding to the subject port 208 to "invalid".

After that, the storage system 100A executes the data transfer from the other ports 208 than the invalid subject port 208, and continues monitoring the transfer rates of the ports 208 (Step 806).

For example, if the path statuses 502 of the ports 208A and 208B are both "valid" in the communication rate management table 213 shown in FIG. 5, data (more accurately, transfer units including the data) are transferred from the ports 208A and 208B alternately. After that, when the value of the transfer ratio 503 of the port 208B becomes less than a predetermined threshold value, the path status 502 corresponding to the port 208B is changed to "invalid". After that, until the path status 502 corresponding to the port 208B is changed to "valid", the data transfer from the port 208B is not executed. During that period, the data transfer from the port 208A is executed, the monitoring of the transfer rate of the port 208A is continued.

If it is judged in Step 802 that the synchronous remote copy is not applied (in other words, the asynchronous remote copy is applied), the storage system 100A judges whether or not the transfer ratio of the subject port 208 is equal to or larger than a predetermined threshold value (Step 807).

If it is judged in Step 807 that the transfer ratio of the subject port 208 is less than the predetermined threshold value, the storage system 100A executes Steps 805 and 806 described above.

On the other hand, if it is judged in Step 807 that the transfer ratio of the subject port 208 is equal to or larger than the predetermined threshold value, the storage system 100A references the transfer ratio 503 of the communication rate management table 213 to transfer data according to the transfer ratio 503 (Step 808). The data transfer performed in Step 808 will be described later.

When Step 804 or 808 ends, the storage system 100A judges whether or not the data to be transferred to the storage system 100B have all been transferred (Step 809).

If it is judged in Step 809 that the data to be transferred have not all been transferred yet, the procedure returns to Step 801 in order to transfer the remaining data.

On the other hand, if it is judged in Step 809 that the data units to be transferred have all been transferred, the storage system 100A continues monitoring the transfer rate of each of the ports 208 (Step 810). In other words, the procedure returns to Step 701 of FIG. 7.

Herein, description is made of the data transfer performed in Step 808.

In Step 808, the storage system 100A transfers data from each of the ports 208 so that the ratio of a data amount transferred from each of the ports 208 becomes equal (or approximate) to the transfer ratio 503.

Specifically, for example, if the path statuses 502 of the ports 208A and 208B are both "valid" in the communication rate management table 213 shown in FIG. 5 with the data transfer performance "A" of the port 208A being "1 ms" and the data transfer performance "B" of the port 208B being "2 ms", Expression (1) is used to calculate the value of the transfer ratio Sa as "1.5" and the value of the transfer ratio Sb as "0.75". In this case, the storage system 100A transfers data so that the ratio of a data amount transferred from the port 208A to a data amount transferred from the port 208B is 1.5:0.75 (in other words, 2:1).

Specifically, the storage system 100A divide the data to be transferred to the storage system 100B into a plurality of transfer units (for example, packets) having a predetermined size, and may transmit two thirds of a total number of those transfer units from the port 208A and transmit one third thereof from the port 208B. Such transmission is executed by, for example, changing the ratio of a round robin used for the ports 208A and 208B.

Alternatively, the storage system 100A may control the data amount included in the transfer unit. Specifically, the storage system 100A may execute the dividing process so that the data amount included in the transfer unit transmitted from the port 208A becomes twice as large as the data amount included in the transfer unit transmitted from the port 208B. The storage system 100A transmits the transfer units created as described above from the ports 208A and 208B alternately.

It should be noted that in actuality, it may be difficult to convert the transfer ratio 503 of the plurality of ports 208 into an integer ratio. In this case, the calculated transfer ratio 503 may be replaced by an approximate integer ratio. The storage system 100A controls the data amount transmitted from each of the ports 208 so that the data amount transmitted from the port 208 whose transfer ratio has been calculated as larger becomes larger.

By the above-mentioned processing, in Step 805, the data transfer via the path 401 having an extremely low transfer rate is suspended. This prevents the path 401 having an extremely low transfer rate from lowering the transfer rates of the other paths 401.

In Step 808, the data having an amount appropriate to the transfer rate is transmitted from each of the ports 208. Accordingly, it is possible to execute the data transfer that effectively uses the plurality of paths 401 without causing the path 401 having a low transfer rate to lower the transfer rates of the other paths 401.

It should be noted that in the example of FIG. 8, if Yes is judged in Step 803 (in other words, the transfer rate of the subject port 208 is equal to or larger than the threshold value), Step 804 is executed, and if Yes is judged in Step 807, Step 808 is executed. However, the same processing as Step 808 may be executed in Step 804, or the same processing as Step 804 may be executed in Step 808.

FIG. 8 shows the procedure for the processing of transferring the copy of the data stored in the primary logical volume 231A to the storage system 100B, but a copy of data stored in the secondary logical volume 231C to the storage system 100A. In this case, the transferred data is stored in the primary logical volume 231A. Such a processing is executed to restore lost data in a case where, for example, the data stored in the primary logical volume 231A is lost.

Also in the case of such restoration, the same processing as shown in FIG. 8 is executed. However, the restoration processing is not executed in response to a write request from the host computer 120. Therefore, the restoration processing cannot be classified into the synchronous remote copy or the asynchronous remote copy.

Therefore, in the case where the restoration processing is executed, Step 802 of FIG. 8 need not be executed. For example, the judgment of Step 803 is executed after Step 801, and according to the judgment result, Step 804 or Steps 805 and 806 are executed. In Step 804, the same processing as Step 808 may be executed.

FIG. 9 is a flowchart showing the sequence without data transfer executed in the first embodiment of this invention.

The processing shown in FIG. 9 is executed if it is judged in Step 703 of FIG. 7 that there is no data to be transferred. In this case, the storage system 100A first executes a path health check on each of the ports 208, and measures a time required for execution thereof (Step 901). The path health check represents a processing of, for example, transmitting a predetermined command from each of the ports 208 to the storage system 100B and measuring a time required to receive a response thereto.

Subsequently, based on the time measured in Step 901, the storage system 100A calculates the transfer ratio of each of the ports 208 (Step 902). The calculation is executed by Expression (1) or (2). In this case, the time measured in Step 901 is used as the transfer rates "A" and the like. The calculated transfer ratio is registered as the transfer ratio 503 into the communication rate management table 213.

Subsequently, the storage system 100A judges whether or not the transfer ratio calculated in Step 902 is equal to or larger than a predetermined threshold value (Step 903).

If it is judged in Step 903 that the transfer ratio is equal to or larger than the predetermined threshold value, the storage system 100A continues monitoring the transfer rate of each of the ports 208 (Step 904). In other words, the procedure returns to Step 701 of FIG. 7.

On the other hand, if it is judged in Step 903 that the transfer ratio is lower than the predetermined threshold value, the storage system 100A suspends the data transfer from the subject port 208 (in other words, port 208 whose transfer ratio is judged as less than the predetermined threshold value) (Step 905). Specifically, the storage system 100A changes the path status 502 of the communication rate management table 213 correspondent to the subject port 208 to "invalid".

After that, the storage system 100A continues monitoring the transfer rates of the other ports 208 than the invalid subject port 208 (Step 906). If there occurs data to be transferred to the storage system 100B, the storage system 100A transmits data from the other ports 208 than the invalid subject port 208.

Figure 10:
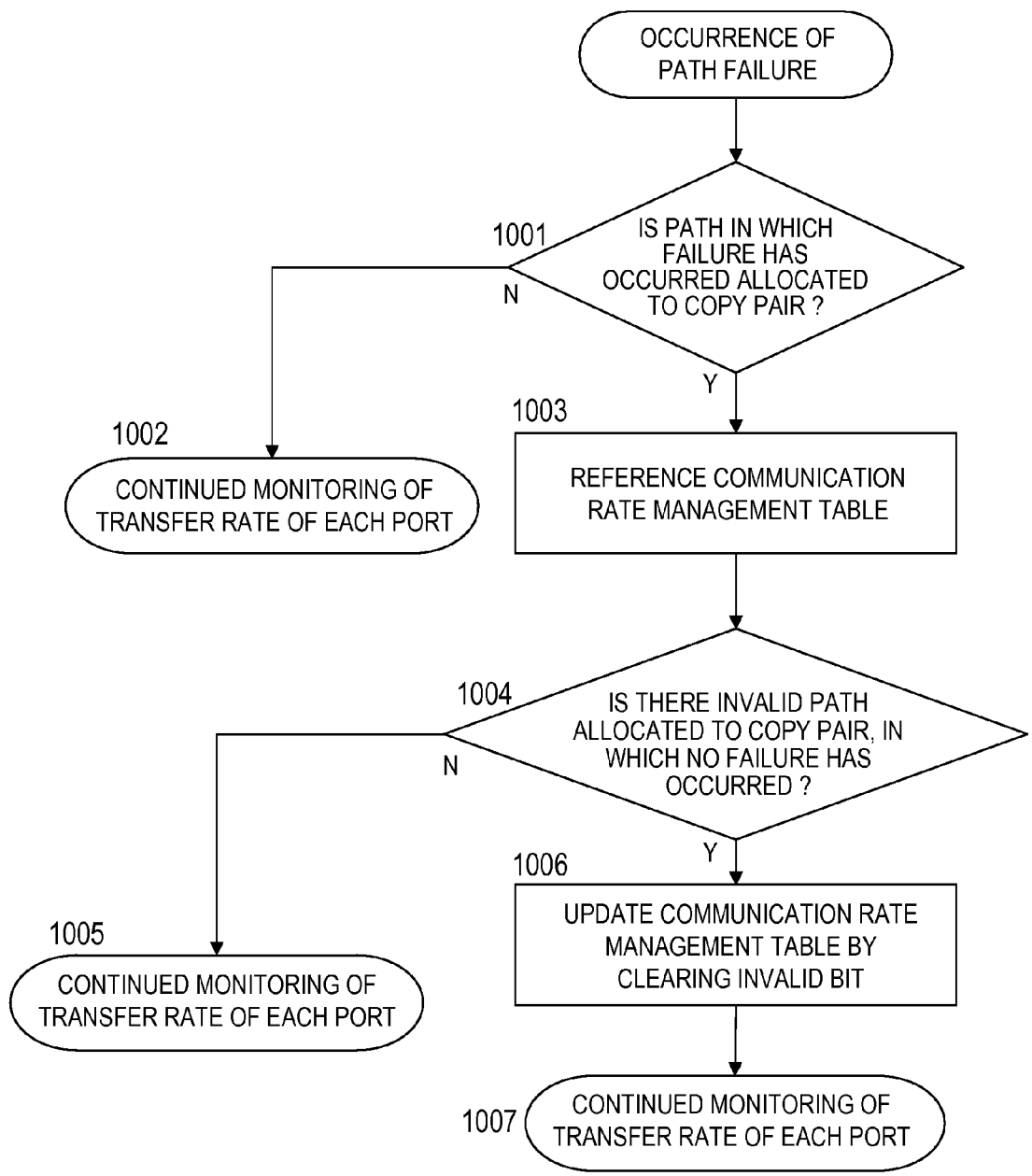
FIG. 10 is a flowchart showing a processing executed if a failure occurs in the path in the first embodiment of this invention.

FIG. 10 is a flowchart showing a processing executed if a failure occurs in the path 401 in the first embodiment of this invention.

First, the storage system 100A judges whether or not the path 401 in which a failure has occurred is allocated to the copy pair (Step 1001). If the port 208 connected to the path 401 in which a failure has occurred is registered in the communication rate management table 213, the path 401 is judged as being allocated to the copy pair.

If it is judged in Step 1001 that the path 401 in which a failure has occurred is not allocated to the copy pair, the storage system 100A continues monitoring the transfer rate of each of the ports 208 (Step 1002). In other words, the procedure returns to Step 701 of FIG. 7.

On the other hand, if it is judged in Step 1001 that the path 401 in which a failure has occurred is allocated to the copy pair, the storage system 100A references the communication rate management table 213 in which the port 208 connected to the path 401 is registered (Step 1003).

Subsequently, based on the communication rate management table 213 referenced in Step 1003, the storage system 100A judges whether or not there is an invalid path 401 in which no failure has occurred (Step 1004). Specifically, the storage system 100A judges whether or not the value "invalid" is set as any one of the path statuses 502 of the other ports 208 than the port 208 connected to the path 401 in which a failure has occurred among the ports 208 registered in the communication rate management table 213 referenced in Step 1003.

If it is judged in Step 1004 that there is no invalid path 401 in which no failure has occurred, the storage system 100A continues monitoring the transfer rates of each of the ports 208 (Step 1005). In other words, the procedure returns to Step 701 of FIG. 7.

On the other hand, if it is judged in Step 1004 that there is an invalid path 401 in which no failure has occurred, the storage system 100A sets the path 401 to be valid (Step 1006). Specifically, the storage system 100A changes the path status 502 of the communication rate management table 213 corresponding to the port 208 connected to the path 401 from "invalid" to "valid". After that, the storage system 100A continues monitoring the transfer rates of each of the ports 208 (Step 1007). In other words, the procedure returns to Step 701 of FIG. 7.

For example, with the path status 502 corresponding to the port 208A being "valid" and the path status 502 corresponding to the port 208B being "invalid" as shown in FIG. 5, if a failure occurs in the path 401A connected to the port 208A, the storage system 100A changes the path status 502 corresponding to the port 208B to "valid".

The fact that the path status 502 corresponding to the port 208B is set to "invalid" means that the transfer rate of the path 401B was lowered at a certain time point in the past. However, after that, it is probable that the transfer rate of the path 401B may be recovered. Therefore, the use of the port 208B is resumed by being triggered by the above-mentioned occurrence of failure in another path 401A. If the transfer rate has already been recovered, the port 208B is again put to use. On the other hand, if the transfer rate has not been recovered yet, the processings of FIGS. 7 and 8 are again performed to set the port 208B to be invalid.

Figure 11:
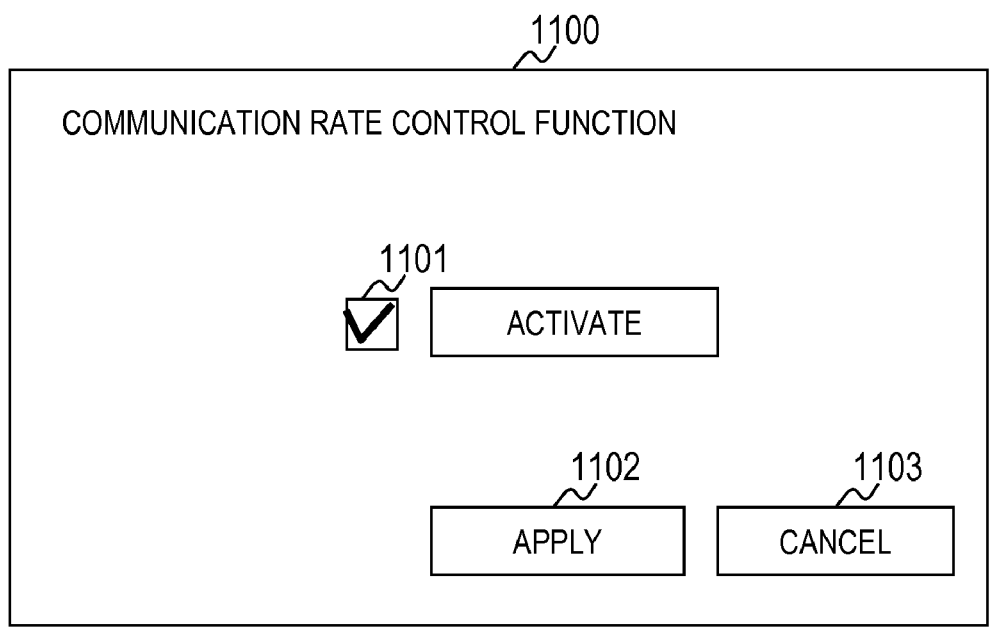
FIG. 11 is an explanatory diagram of a setting screen displayed in the first embodiment of this invention.

FIG. 11 is an explanatory diagram of a setting screen displayed in the first embodiment of this invention.

A setting screen 1100 shown in FIG. 11 is displayed in, for example, the display section 223 of the maintenance-purpose terminal device 207 of the storage system 100A.

The setting screen 1100 is displayed in order to set whether or not to use a communication rate control function, in other words, whether or not the processings of FIGS. 7 to 10 are to be executed. The setting screen 1100 includes a check box 1101, an apply button 1102, and a cancel button 1103.

When the administrator of the storage system 100A uses the input section 222 to input a check mark in the check box 1101 and operates the apply button 1102, the communication rate control function is set to be active. In this case, the processings of FIGS. 7 to 10 are executed.

On the other hand, when the administrator of the storage system 100A removes the check mark from the check box 1101 and then operates the apply button 1102, the communication rate control function is set to be inactive. In this case, the processings of FIGS. 7 to 10 are not executed.

When the administrator of the storage system 100A operates the cancel button 1103, the input currently made to the check box 1101 is canceled.

FIG. 11 shows the example where the setting screen 1100 is used only for setting the communication rate control function, but the setting screen 1100 may be used for setting another function. For example, as described by referring to FIG. 8, such data transfer according to the transfer ratio as in Step 808 may not be executed in Step 808, or may be executed in Step 804. The administrator may use the setting screen 1100 to thereby set whether or not to execute the data transfer according to the transfer ratio. In this case, the setting screen 1100 includes a check box (not shown) for an input indicating whether or not to activate the data transfer according to the transfer ratio.

Alternatively, the setting screen 1100 may include a text box (not shown) for receiving an input of a threshold value. The administrator can input an arbitrary threshold value into the text box. The threshold value thus inputted is used in Steps 803 and 807 of FIG. 8 and Step 903 of FIG. 9.

It should be noted that the communication rate control function may be set to be active by the administrator as described above, but may be previously set to be active without depending on the selection by the administrator. In this case, the setting screen 1100 need not be displayed in the display section 223.

Next, by referring to FIGS. 12 and 13, description will be made of effects of this embodiment.

Figure 12:
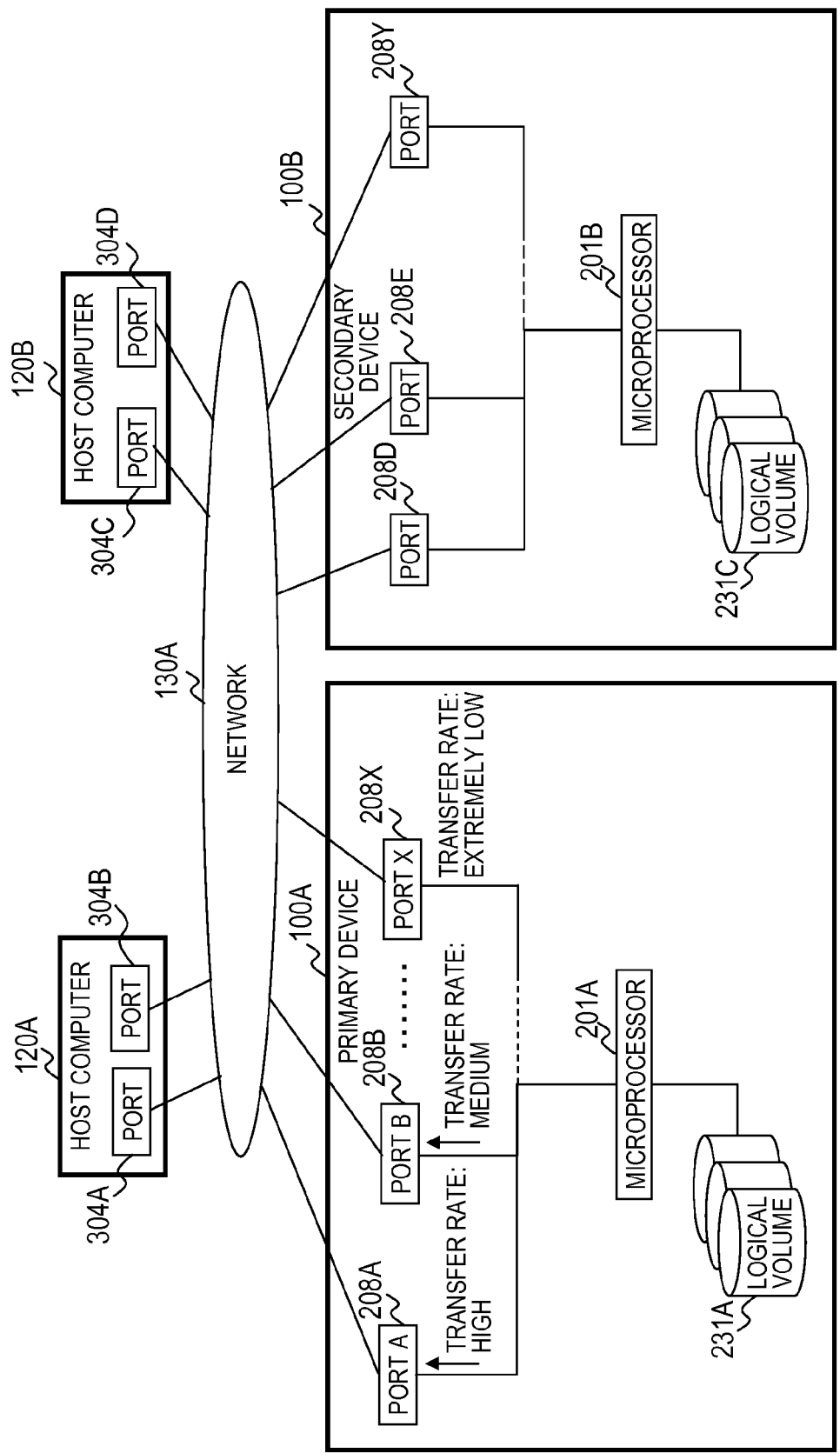
FIG. 12 is an explanatory diagram of data transfer executed by the storage system in a case where a communication rate control function is set to be inactive according to the first embodiment of this invention.

FIG. 12 is an explanatory diagram of data transfer executed by the storage system in a case where the communication rate control function is set to be inactive according to the first embodiment of this invention.

The data transfer shown in FIG. 12 is the same as the data transfer executed by the conventional storage system (in other words, to which this invention is not applied).

The host computers 120 and the storage systems 100 of FIG. 12 are the same as those shown in FIGS. 2 through 4. However, in FIG. 12, the microprocessor 201 of the storage system 100A is referred to as a microprocessor 201A, and the microprocessor 201 of the storage system 100B is referred to as a microprocessor 201B. In addition, the two ports 304 of the host computer 120B are referred to as ports 304C and 304D.

In FIG. 12, a copy of data stored in the logical volume 231A is transferred from the storage system 100A to the storage system 100B, and stored into the logical volume 231C. At this time, transfer units including the data are transmitted from the plurality of ports 208 including the ports 208A, 208B, and 208X in order.

For example, in a case where the transfer rate of the port 208A is relatively high with the transfer rate of the port 208B being lower than that and the transfer rate of the port 208X being extremely low, as described by referring to FIG. 4, the transfer rates of the ports 208A and 208B are lowered under the influence of the transfer rate of the port 208X. This eliminates the advantage of using the plurality of ports to transfer data.

Figure 13:
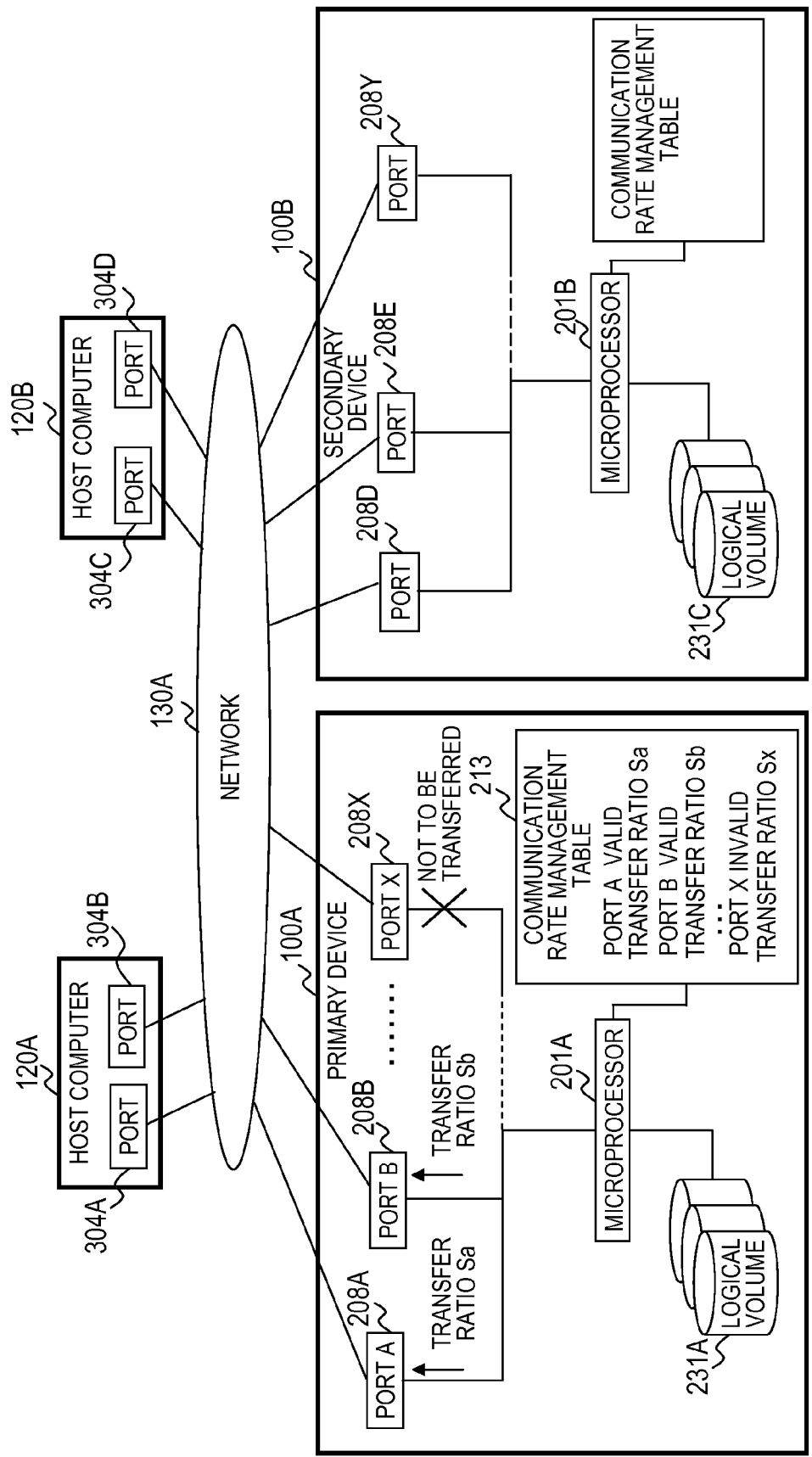
FIG. 13 is an explanatory diagram of the data transfer executed by the storage system in a case where the communication rate control function is set to be active according to the first embodiment of this invention.

FIG. 13 is an explanatory diagram of the data transfer executed by the storage system in a case where the communication rate control function is set to be active according to the first embodiment of this invention.

In a case where the communication rate control function is set to be active, the storage system 100A calculates the transfer ratio of each of the ports 208 as shown in Expression (2). For example, if a transfer ratio Sx of the port 208X becomes lower than a threshold value due to the extremely low transfer rate of the port 208X in the same manner as the case of FIG. 12, the storage system 100A does not use the port 208X for the data transfer. This can prevent the transfer rates of the other ports 208 from being lowered.

Further, data transmitted from the ports 208A and 208B have amounts according to their transfer ratios Sa and Sb, respectively. Accordingly, it is possible to effectively use the plurality of paths 401 without causing the path 401 having a low transfer rate to exert an influence on the transfer rates of the other paths 401.

Second Embodiment

The above-mentioned first embodiment has been described in terms of the control of the data transfer path in the case where the remote copy is executed. However, data transfer between storage systems are also executed for a processing other than the remote copy, for example, so-called external connection. Hereinafter, by referring to the figures, the description will be made by taking an example of applying this invention to the data transfer for the external connection.

Figure 14:
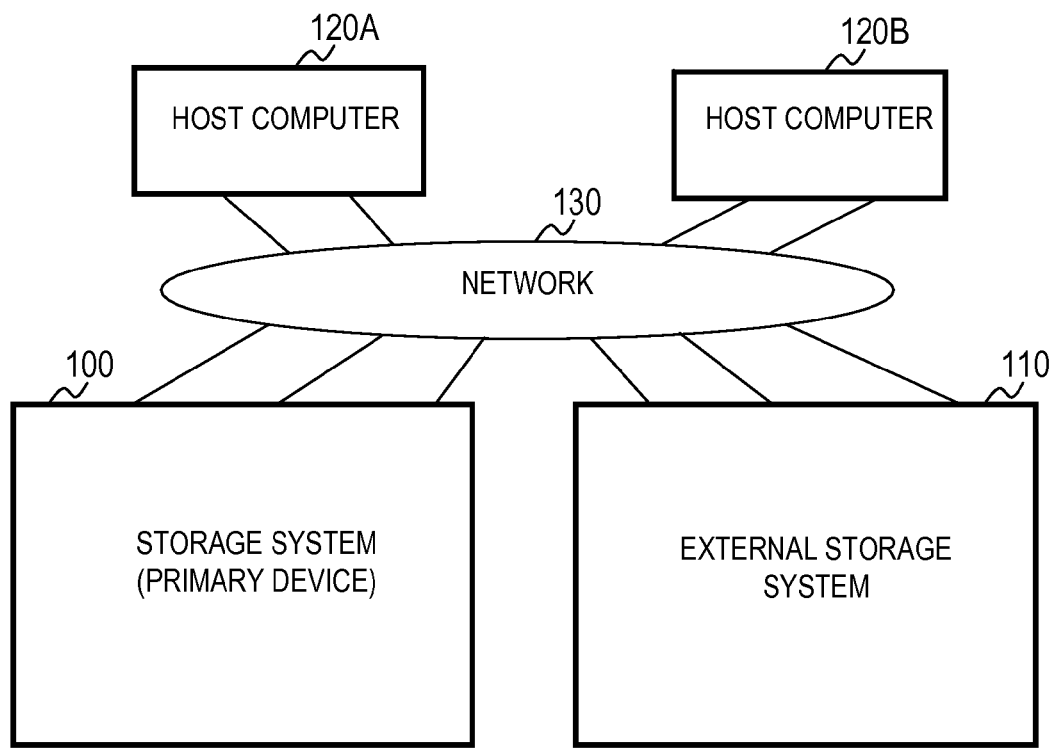
FIG. 14 is a block diagram showing a configuration of a computer system according to a second embodiment of this invention.

FIG. 14 is a block diagram showing a configuration of a computer system according to the second embodiment of this invention.

The computer system of this embodiment includes one storage system 100, one external storage system 110, and at least one host computer 120. FIG. 14 shows host computers 120A and 120B as the at least one host computer 120. As shown in FIGS. 1 and 3, since the host computers 120A and 120B are the same as those shown in the first embodiment of this invention, detailed description thereof is omitted.

The storage system 100 is connected to the host computer 120 via a network 130. In addition, the storage system 100 is connected to the external storage system 110 via the network 130.

The network 130 is the same as the networks 130A and the like according to the first embodiment of this invention.

Figure 15:
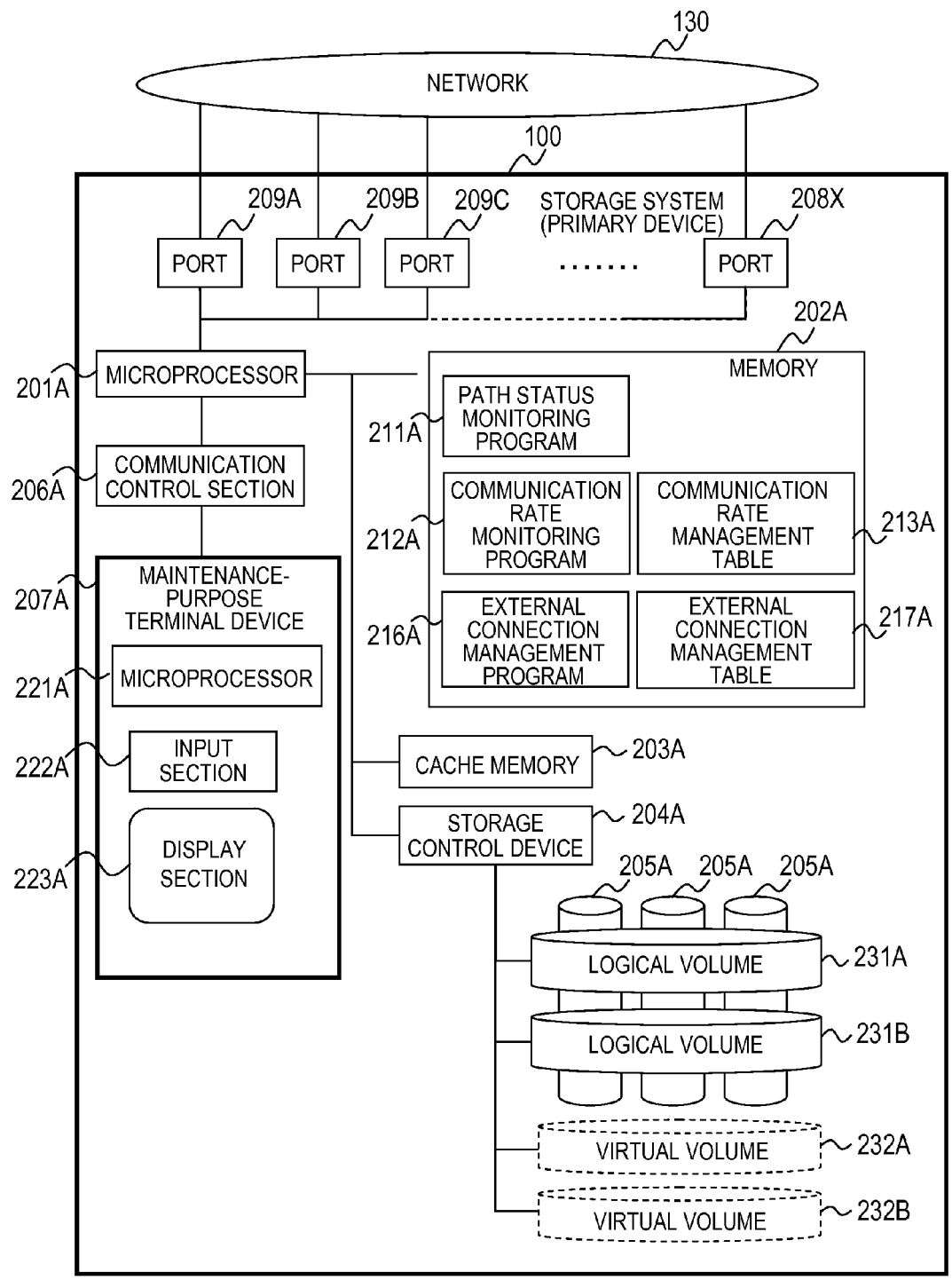
FIG. 15 is a block diagram showing a configuration of a storage system according to the second embodiment of this invention.

FIG. 15 is a block diagram showing a configuration of the storage system 100 according to the second embodiment of this invention.

The storage system 100 includes a microprocessor 201A, a memory 202 A, a cache memory 203A, a storage control device 204A, a storage device 205A, a communication control section 206A, a maintenance-purpose terminal device 207A, a plurality of ports 209 (in the example of FIG. 15, ports 209A, 209B, 209C, and 209X).

Since the microprocessor 201A, the memory 202A, the cache memory 203A, the storage control device 204A, the storage device 205A, the communication control section 206A, and the maintenance-purpose terminal device 207A are similar to the microprocessor 201, the memory 202, the cache memory 203, the storage control device 204, the storage device 205, the communication control section 206, and the maintenance-purpose terminal device 207 of the first embodiment, respectively, description thereof is omitted.

Stored in the memory 202A are a path status monitoring program 211A, a communication rate monitoring program 212A, a communication rate management table 213A, an external connection management program 216A, and an external connection management table 217A. In the following description, processings executed by the storage system 100 are realized by the microprocessor 201A executing the programs stored in the memory 202A in actuality.

The path status monitoring program 211A, the communication rate monitoring program 212A, and the communication rate management table 213A are similar to the path status monitoring program 211, the communication rate monitoring program 212, and the communication rate management table 213 of the first embodiment, respectively. The external connection management program 216A and the external connection management table 217A are executed and referenced, respectively, in order to realize an external connection function of the storage system 100. The external connection function will be described later.

The logical volumes 231A and 231B managed by the storage system 100 of the second embodiment are the same as those described in the first embodiment. Further, the storage system 100 of the second embodiment uses the external connection function to thereby provide virtual volumes 232A and 232B to the host computer 120. Detailed description thereof will be described later. Hereinafter, the virtual volumes 232A and 232B will also be referred to generically as a virtual volume 232 for common description thereof.

The maintenance-purpose terminal device 207A includes a microprocessor 221A, an input section 222A, and a display section 223A. Those components are similar to the microprocessor 221, the input section 222, and the display section 223 of the first embodiment, respectively, and hence description thereof is omitted.

The ports 209A, 209B, 209C, and 209X are connected to the network 130, and used for communications performed between the storage system 100 and the host computer 120 or the external storage system 110. Hereinafter, the ports 209A, 209B, 209C, and 209X will also be referred to generically as the port 209 for common description thereof. The same holds true of a port 209D and the like, which will be described later.

FIG. 15 shows four ports 209, but the storage system 100 may be provided with any number of ports 209.

Figure 16:
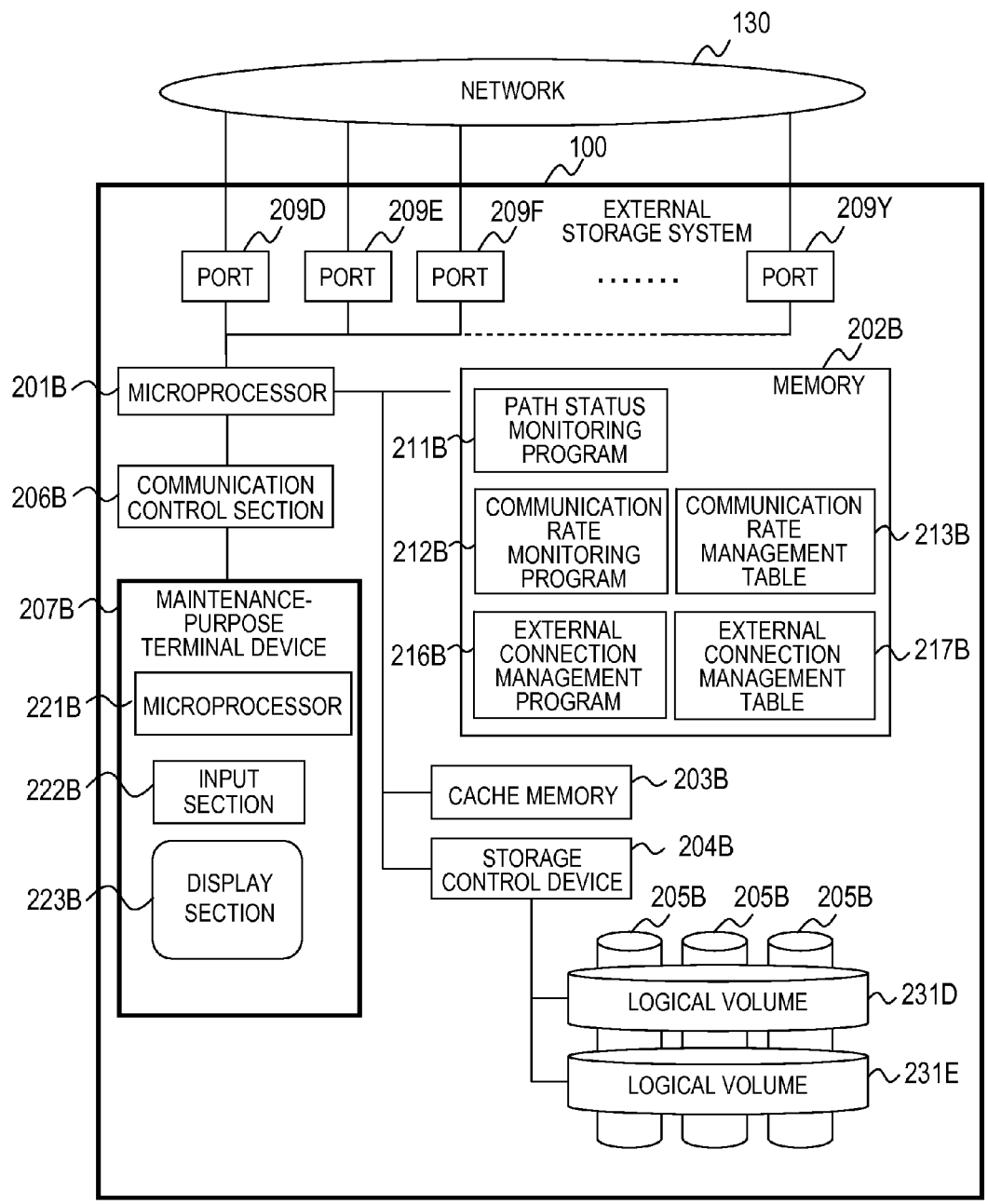
FIG. 16 is a block diagram showing a configuration of an external storage system according to the second embodiment of this invention.

FIG. 16 is a block diagram showing a configuration of the external storage system 110 according to the second embodiment of this invention.

The external storage system 110 includes a microprocessor 201B, a memory 202B, a cache memory 203B, a storage control device 204B, a storage device 205B, a communication control section 206B, a maintenance-purpose terminal device 207B, and a plurality of ports 209 (in the example of FIG. 16, ports 209D, 209E, 209F, and 209Y).

Since the microprocessor 201B, the memory 202B, the cache memory 203B, the storage control device 204B, the storage device 205B, the communication control section 206B, and the maintenance-purpose terminal device 207B are similar to the microprocessor 201A, the memory 202A, the cache memory 203A, the storage control device 204A, the storage device 205A, the communication control section 206A, and the maintenance-purpose terminal device 207A which are shown in FIG. 15, respectively, description thereof is omitted.

Stored in the memory 202B are a path status monitoring program 211B, a communication rate monitoring program 212B, a communication rate management table 213B, an external connection management program 216B, and an external connection management table 217B. In the following description, processings executed by the external storage system 110 are realized by the microprocessor 201B executing the programs stored in the memory 202B in actuality.

The path status monitoring program 211B, the communication rate monitoring program 212B, the communication rate management table 213B, the external connection management program 216B, and the external connection management table 217B are similar to the path status monitoring program 211A, the communication rate monitoring program 212A, the communication rate management table 213A, the external connection management program 216A, and the external connection management table 217A, respectively.

It should be noted that the external storage system 110 may not have the external connection function, which will be described later. Therefore, the memory 202B may not store therein the external connection management program 216B or the external connection management table 217B.

The logical volumes 231D and 231E managed by the external storage system 110 are storage areas defined in the same manner as the logical volumes 231A and 231B. However, as described later, the logical volumes 231D and 231E are associated with the virtual volumes 232A and 232B. As a rule, the host computer 120 does not issue a request for data input/output directly to the logical volumes 231D and 231E.

The ports 209D, 209E, 209F, and 209Y are connected to the network 130, and used for communication performed between the external storage system 110 and the storage system 100. FIG. 16 shows four ports 209, but the external storage system 110 may be provided with any number of ports 209.

Here, the external connection function of the storage system 100 is described.

The virtual volume 232 provided to the host computer 120 by the storage system 100 is recognized by the host computer 120 as the same kind of storage area as the logical volume 231. However, the virtual volume 232 is not allocated to a physical storage area provided by the storage device 205A of the storage system 100. Instead, the virtual volume 232 is associated with the logical volume 231 of the external storage system 110.

Here, the description is made by taking an example where the virtual volume 232A is associated with the logical volume 231D with the virtual volume 232B being associated with the logical volume 231E. Information that defines such a correlation is registered in the external connection management table 217A.

The host computer 120 transmits, for example, a data write request with respect to the virtual volume 232A. The storage system 100, which has received the request, references the external connection management table 217A to identify the logical volume 231D of the external storage system 110 associated with the virtual volume 232A. Then, the storage system 100 transmits the data write request for writing the requested data into the logical volume 231D to the external storage system 110.

The external storage system 110 stores the data into the logical volume 231D according to the data write request received from the storage system 100.

The data write processing with respect to the virtual volume 232A takes place by the other cause than the data write request from the host computer 120, for example, by copying data from the logical volume 231 within the storage system 100. For example, when the storage system 100 copies data stored in the logical volume 231A to the virtual volume 232A, the data is actually transferred to the external storage system 110 and stored into the logical volume 231D.

Also when a data read request with respect to the virtual volume 232A is received from the host computer 120, the storage system 100 similarly references the external connection management table 217A to read data from the logical volume 231D. Then, the storage system 100 transmits the read data to the host computer 120.

As described above, also in the case where the data written in the virtual volume 232A is transferred from the storage system 100 to the external storage system 110, in the same manner as the case of the remote copy, a plurality of data transfer paths are used. Therefore, also in the case of the external connection, in the same manner as the case of the remote copy, there exists such a problem that the lowered transfer rate of one of the paths may lower the transfer rates of the other paths. A processing executed to solve the above-mentioned problem will be described hereinbelow.

Figure 17:
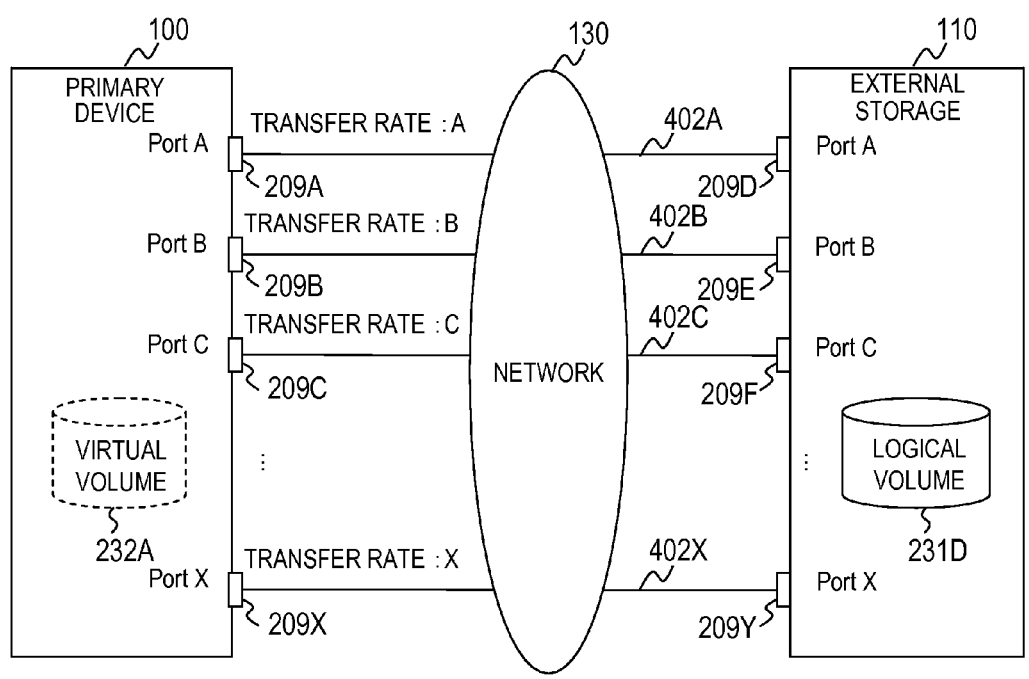
FIG. 17 is an explanatory diagram of data transfer paths between the storage system and the external storage system according to the second embodiment of this invention.

FIG. 17 is an explanatory diagram of data transfer paths between the storage system 100 and the external storage system 110 according to the second embodiment of this invention.

In this embodiment, a path 402A is set between the port 209A of the storage system 100 and the port 209D of the external storage system 110. In the same manner, a path 402B is set between the port 209B and the port 209E, a path 402C is set between the port 209C and the port 209F, and a path 402X is set between the port 209X and the port 209Y. Hereinafter, the paths 402A, 402B, 402C, and 402X will also be referred to generically as a path 402 for common description thereof.

The storage system 100 can transfer data to the external storage system 110 via those paths 402. In this embodiment, in order to store the data written in the virtual volume 232A into the logical volume 231D, the data is transferred from the storage system 100 to the external storage system 110.

The plurality of paths 402 are used, for example, in a round robin manner similarly to the paths 401 of the first embodiment. The transfer rate of the path 402 is evaluated by the same index as the path 401 of the first embodiment.

As shown in FIG. 5, since the communication rate management table 213A of this embodiment is the same as the communication rate management table 213 of the first embodiment, illustration and description thereof are omitted. However, "Port A" and "Port B" of FIG. 5 correspond to the port 209A and the port 209B, respectively, in the second embodiment.

Figure 18:
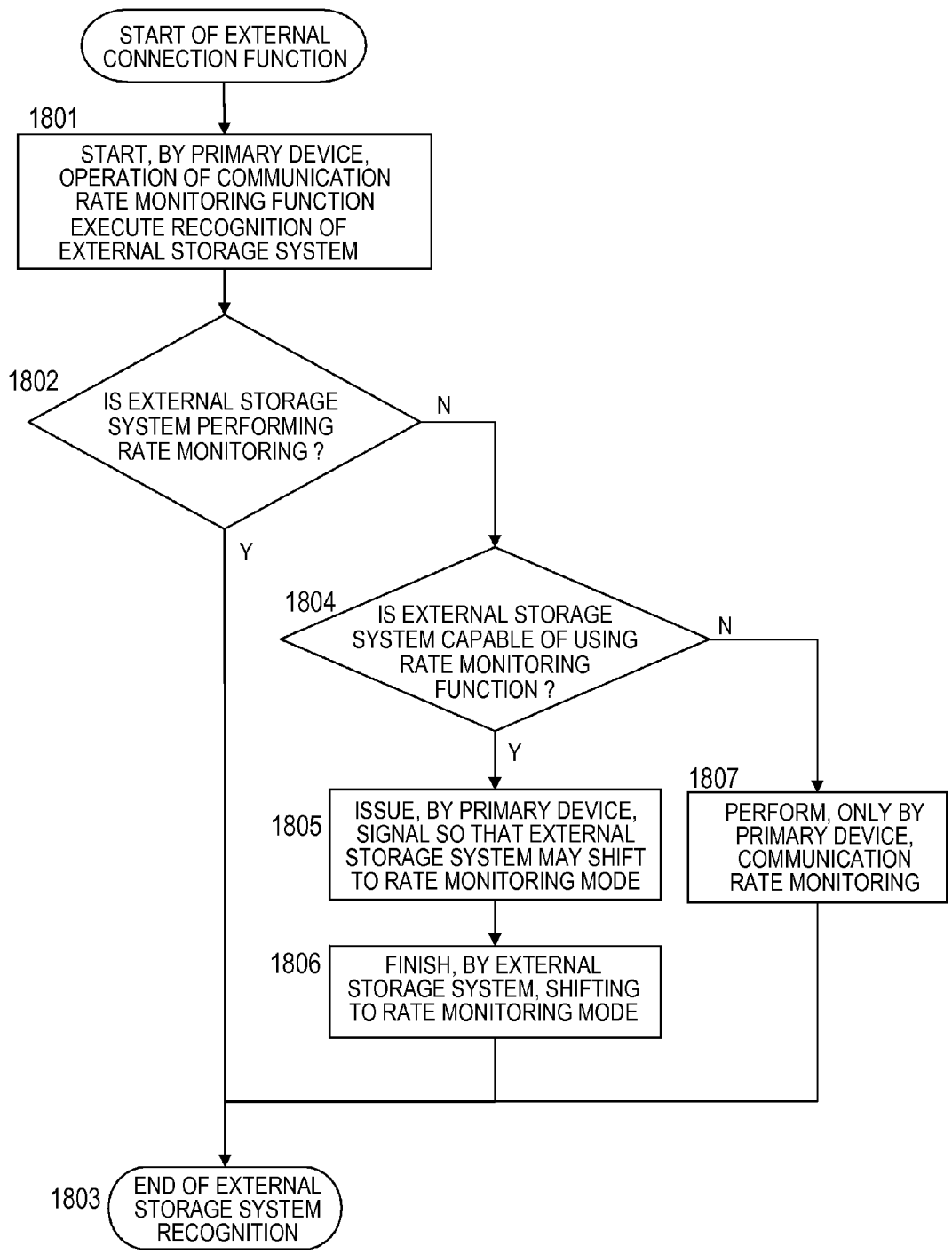
FIG. 18 is a flowchart showing a processing of starting an external connection function which is executed in the second embodiment of this invention.

FIG. 18 is a flowchart showing a processing of starting the external connection function which is executed in the second embodiment of this invention.

First, the storage system 100 starts an operation of the communication rate monitoring function, and then recognizes the external storage system 110 (Step 1801).

Subsequently, the storage system 100 judges whether or not the external storage system 110 is performing rate monitoring (Step 1802). Herein, the rate monitoring represents a processing in which, as described in the first embodiment by referring to FIG. 4, the external storage system 110 receives a data write request from the storage system 100, and when storing the data into the logical volume 231 (in actuality, cache memory 203B), measures a time required for the storing to transmit the time to the storage system 100.

The remote copy of the first embodiment cannot be executed unless both the primary device and the secondary device have a remote copy function. On the other hand, the external connection of the second embodiment is realized basically by only a function of the primary device (in other words, storage system 100). Therefore, a relatively less functional storage system may be used as the external storage system 110.

Therefore, there may be a case where the external storage system 110 does not have a function of the rate monitoring. Alternatively, there is a case where the external storage system 110 has the function of the rate monitoring, but is set to a mode in which the function is not used.

If it is judged in Step 1802 that the external storage system 110 is performing the rate monitoring, the external storage system 110 has the function of the rate monitoring, and has already been using the function. In this case, the storage system 100 brings the recognition of the external storage system 110 to an end (Step 1803).

On the other hand, if it is judged in Step 1802 that the external storage system 110 is not performing the rate monitoring, the storage system 100 judges whether or not the external storage system 110 is capable of executing the rate monitoring (in other words, whether or not the external storage system 110 has the function of the rate monitoring) (Step 1804). The judgment may be made based on previously-supplied information including model information of, for example, the connected external storage system 110.

If it is judged in Step 1804 that the external storage system 110 is capable of executing the rate monitoring, the external storage system 110 has the function of the rate monitoring but is not using the function at this time point. In this case, the storage system 100 transmits a signal to the external storage system 110, the signal instructing to shift to a mode in which the function of the rate monitoring is used (hereinafter, referred to as "rate monitoring mode") (Step 1805).

The external storage system 110, which has received the signal, shifts to the rate monitoring mode (Step 1806). After that, the recognition of the external storage system 110 is brought to an end (Step 1803).

On the other hand, if it is judged in Step 1804 that the external storage system 110 is not capable of executing the rate monitoring, the external storage system 110 does not have the function of the rate monitoring. In this case, the storage system 100 monitors the transfer rate by using only the function included in the storage system 100 (in other words, primary device) (Step 1807). After that, the recognition of the external storage system 110 is brought to an end (Step 1803).

It should be noted that there are some possible methods of monitoring the communication rate by using only the function included in the storage system 100. For example, immediately after finishing writing data into the logical volume 231D of the external storage system 110, the storage system 100 may read the data. If data is read immediately after the writing of the data has been finished, a cache hit is achieved almost always at a time point when the data is read, and hence the cache write time is not included in a time that has elapses after the storage system 100 transmits the read request until receiving the response. Therefore, the time measured as described above can be used as the response time of the path 402.

Alternatively, the storage system 100 may measure the response time of the path 402 by continuously (for example, periodically) performing polling that does not involve data write and read with respect to the external storage system 110.

Alternatively, based on a length of data to be written, the storage system 100 may estimate a time required to write the data into the cache memory 203.

Figure 19:
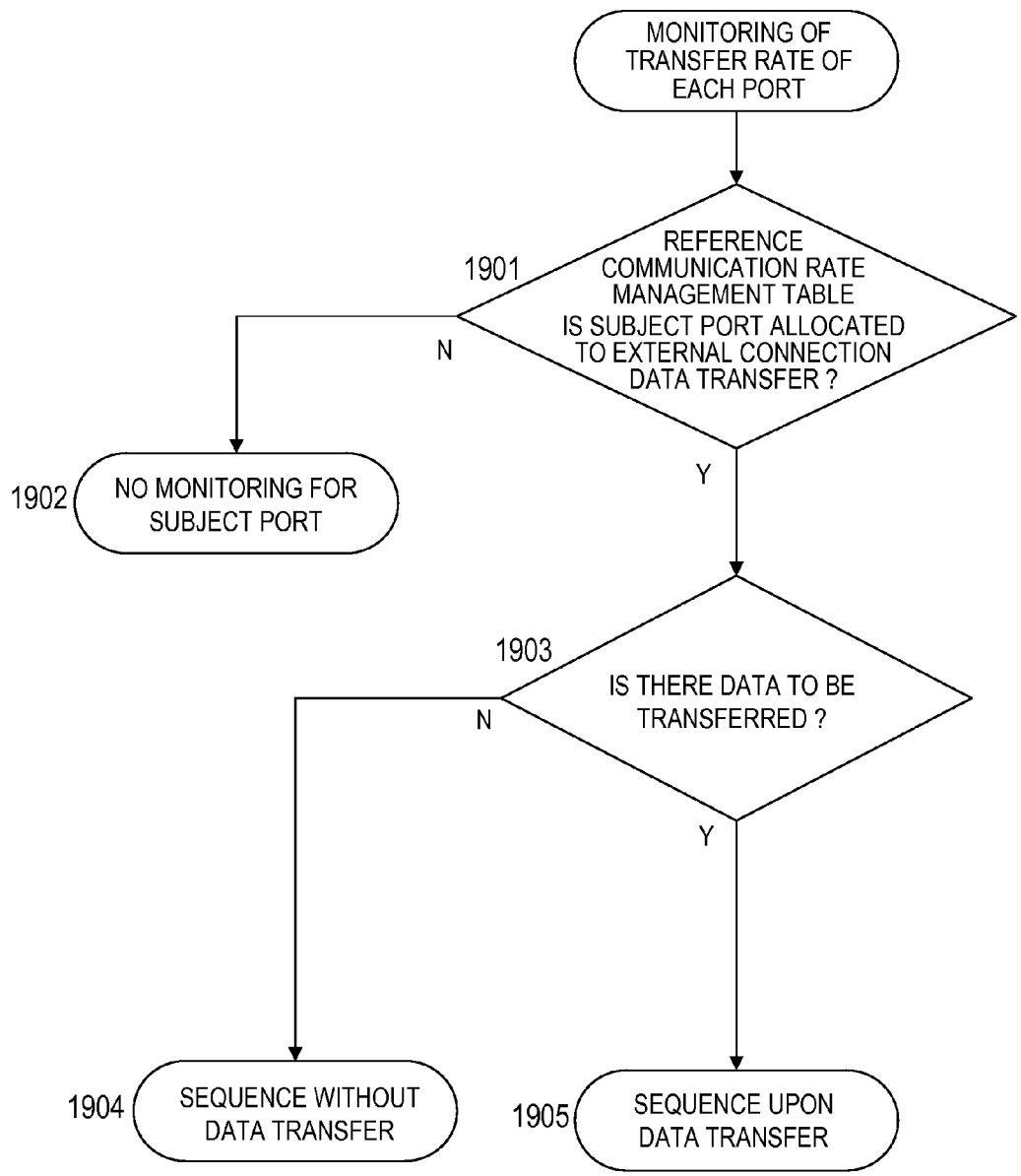
FIG. 19 is a flowchart showing a transfer rate monitoring processing executed on each of ports in the second embodiment of this invention.

FIG. 19 is a flowchart showing a transfer rate monitoring processing executed on each of the ports 209 in the second embodiment of this invention.

The storage system 100 executes the processing shown in FIG. 19 on each of the paths 402 (in other words, for each of the ports 209 of the storage system 100 that is connected to the each of the paths 402). This processing may be executed at a predetermined timing (for example, periodically). Hereinafter, the path 402 and the port 209 that are subjected to a transfer rate management processing will be referred to as "subject path 402" and "subject port 209", respectively.

First, the storage system 100 references the communication rate management table 213A to judge whether or not the subject port 209 is allocated to data transfer for the external connection (Step 1901). If the subject port 209 is registered as the port information 501 of the communication rate management table 213A, it is judged that the subject port 209 is allocated to the data transfer for the external connection.

If the subject port 209 is not allocated to the data transfer for the external connection, the storage system 100 does not monitor the transfer rate of the subject port 209 (in other words, transfer rate of subject path 402) (Step 1902).

On the other hand, if the subject port 209 is allocated to the data transfer for the external connection, the storage system 100 judges whether or not there is data to be transferred (Step 1903).

Specifically, after the logical volume 231D is associated with the virtual volume 232A, if there occurs a data write processing from the host computer 120 to the virtual volume 232A takes place, the written data is held in the cache memory 203A as the data to be transferred until the written data is transferred to the external storage system 110. In such a case where the data to be transferred is held in the cache memory 203A, it is judged in Step 1903 that there is data to be transferred. If it is judged in Step 1903 that there is no data to be transferred, the storage system 100 executes a sequence without data transfer (Step 1904).

Figure 21:
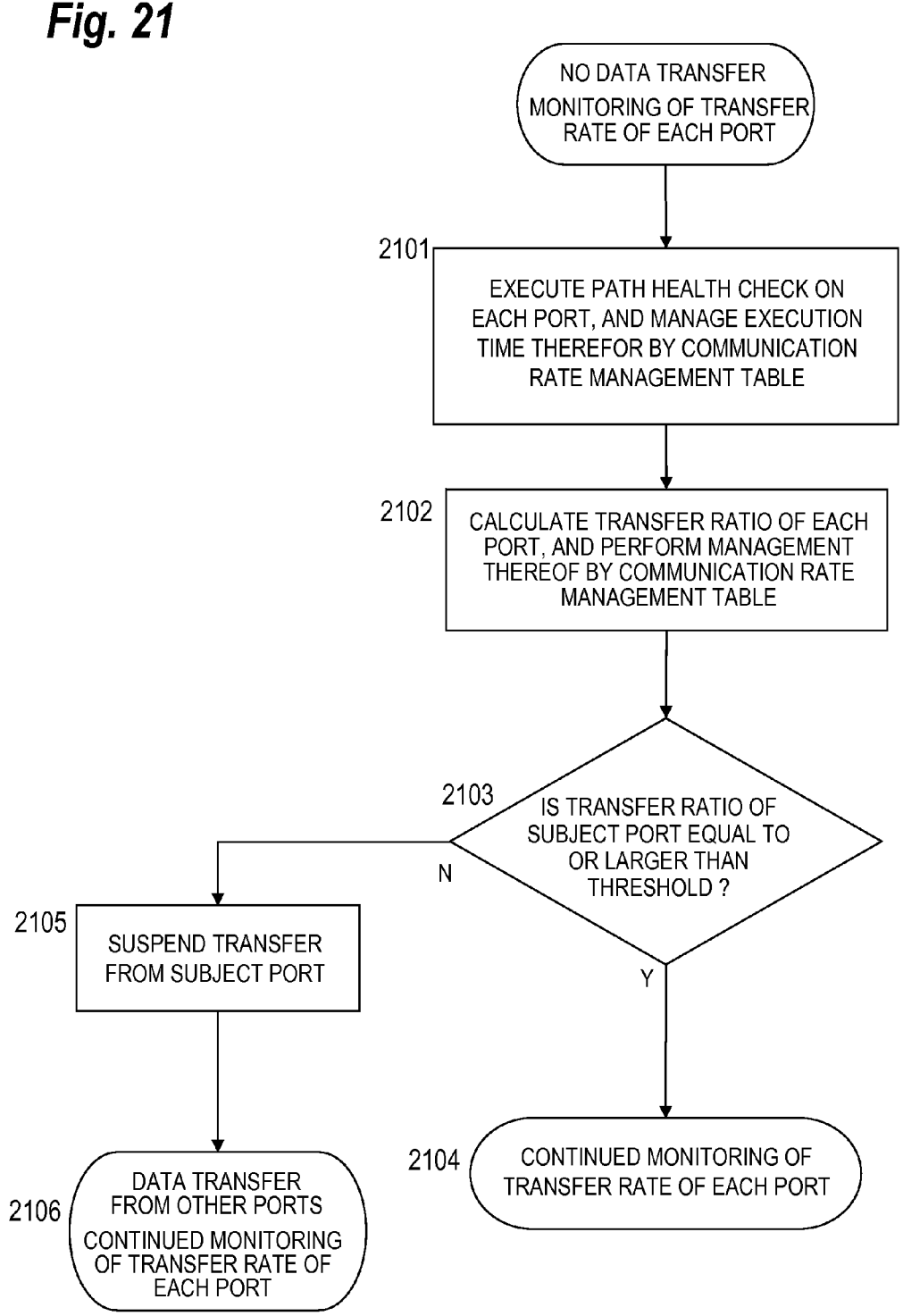
FIG. 21 is a flowchart showing a sequence without data transfer executed in the second embodiment of this invention.

The sequence without data transfer will be described later as shown in FIG. 21.

On the other hand, if it is judged in Step 1903 that there is data to be transferred, the storage system 100 executes a sequence upon data transfer (Step 1905). The sequence upon data transfer will be described later as shown in FIG. 20.

Figure 20:
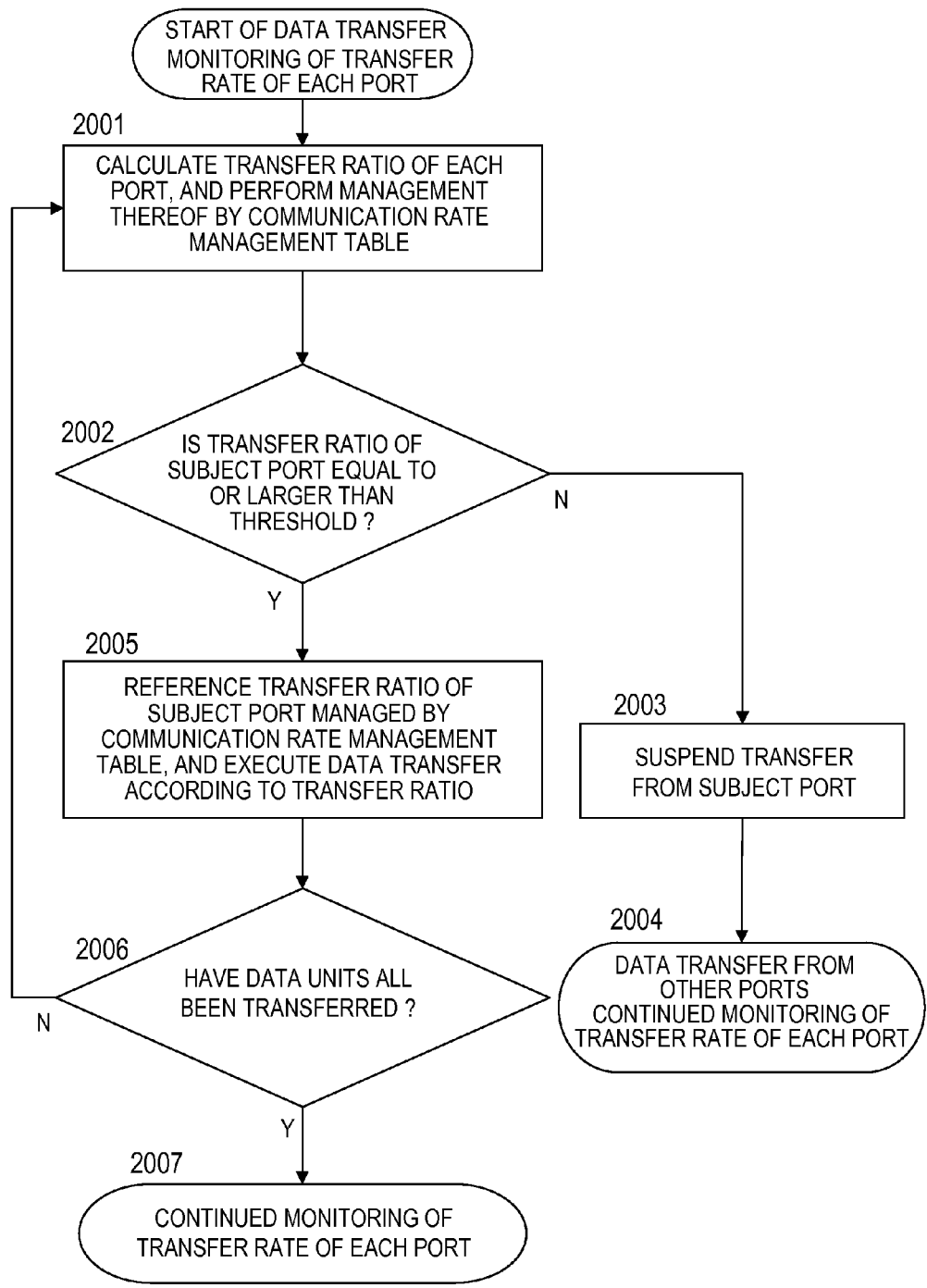
FIG. 20 is a flowchart showing a sequence upon data transfer executed in the second embodiment of this invention.

FIG. 20 is a flowchart showing the sequence upon data transfer executed in the second embodiment of this invention.

The processing shown in FIG. 20 is executed if it is judged in Step 1903 of FIG. 19 that there is data to be transferred. In this case, the storage system 100 first calculates the transfer ratio of each of the ports 209 as shown in Expression (1) or (2), and registers the calculated transfer ratio as the transfer ratio 503 of the communication rate management table 213A (Step 2001).

Subsequently, the storage system 100 judges whether or not the transfer ratio of the subject port 209 is equal to or larger than a predetermined threshold value (Step 2002).

If it is judged in Step 2002 that the transfer ratio of the subject port 209 is less than the predetermined threshold value, the storage system 100 suspends the data transfer from the subject port 209 (Step 2003). Specifically, the storage system 100 changes the path status 502 of the communication rate management table 213A corresponding to the subject port 209 to "invalid".

After that, the storage system 100 executes the data transfer from the other ports 209 than the invalid subject port 209, and continues monitoring the transfer rates of those ports 209 (Step 2004).

On the other hand, if it is judged in Step 2002 that the transfer ratio of the subject port 209 is equal to or larger than the predetermined threshold value, the storage system 100 references the transfer ratio 503 of the communication rate management table 213A to transfer data according to the transfer ratio 503 (Step 2005). Since the data transfer performed in Step 2005 is the same as the data transfer performed in Step 808 of FIG. 8, description thereof is omitted.

Subsequently, the storage system 100 judges whether or not the data to be transferred to the external storage system 110 have all been transferred (Step 2006).

If it is judged in Step 2006 that the data to be transferred have not all been transferred yet, the procedure returns to Step 2001 in order to transfer the remaining data.

On the other hand, if it is judged in Step 2006 that the data to be transferred have all been transferred, the storage system 100 continues monitoring the transfer rate of each of the ports 209 (Step 2007). In other words, the procedure returns to Step 1901 of FIG. 19.

By the above-mentioned processing, in Step 2003, the data transfer via the path 402 having an extremely low transfer rate is suspended. This prevents the path 402 having an extremely low transfer rate from lowering the transfer rates of the other paths 402.

In Step 2005, the data having an amount appropriate to the transfer rate is transmitted from each of the ports port 209. Accordingly, it is possible to execute the data transfer that effectively uses the plurality of paths 402 without causing the path 402 having a low transfer rate to lower the transfer rates of the other paths 402.

It should be noted that in the example of FIG. 20, the same transfer as in Step 808 of FIG. 8 is executed in Step 2005, but instead, the same transfer as in Step 804 of FIG. 8 may be executed in Step 2005.

FIG. 21 is a flowchart showing the sequence without data transfer executed in the second embodiment of this invention.

The processing shown in FIG. 21 is executed if it is judged in Step 1903 of FIG. 19 that there is no data to be transferred. In this case, the storage system 100 first executes a path health check on each of the ports 208, and measures a time required for execution thereof (Step 2101). This processing is the same as that executed in Step 901 of FIG. 9.

Subsequently, based on the time measured in Step 2101, the storage system 100 calculates the transfer ratio of each of the ports 209 (Step 2102). The calculation is executed in the same manner as in Step 902 of FIG. 9. The calculated transfer ratio is registered as the transfer ratio 503 into the communication rate management table 213A.

Subsequently, the storage system 100 judges whether or not the transfer ratio calculated in Step 2102 is equal to or larger than a predetermined threshold value (Step 2103).

If it is judged in Step 2103 that the transfer ratio is equal to or larger than the predetermined threshold value, the storage system 100 continues monitoring the transfer rate of each of the ports 208 (Step 2104). In other words, the procedure returns to Step 1901 of FIG. 19.

On the other hand, if it is judged in Step 2103 that the transfer ratio is lower than the predetermined threshold value, the storage system 100 suspends the data transfer from the subject port 209 (in other words, port 209 whose transfer ratio is judged as less than the predetermined threshold value) (Step 2105). Specifically, the storage system 100 changes the path status 502 of the communication rate management table 213A correspondent to the subject port 209 to "invalid".

After that, the storage system 100 continues monitoring the transfer rates of the other ports 209 than the invalid subject port 209 (Step 2106). If there occurs data to be transferred to the external storage system 110, the storage system 100 transmits data from the other ports 209 than the invalid subject port 209.

In order to set whether or not to use such a communication rate control function as described above, in other words, whether or not to execute the processings of FIGS. 19 through 21, as shown in FIG. 11, the same setting screen 1100 as in the first embodiment may be used.

In the same manner as the case of the first embodiment, the setting screen 1100 may be used for inputting a threshold value. Further, the setting screen 1100 may be used in Step 2005 of FIG. 20 in order to select which of the same transfer as in Step 808 of FIG. 8 and the same transfer as in Step 804 of FIG. 8 is to be executed.

Next, by referring to FIGS. 22 and 23, description will be made of effects of this embodiment.

Figure 22:
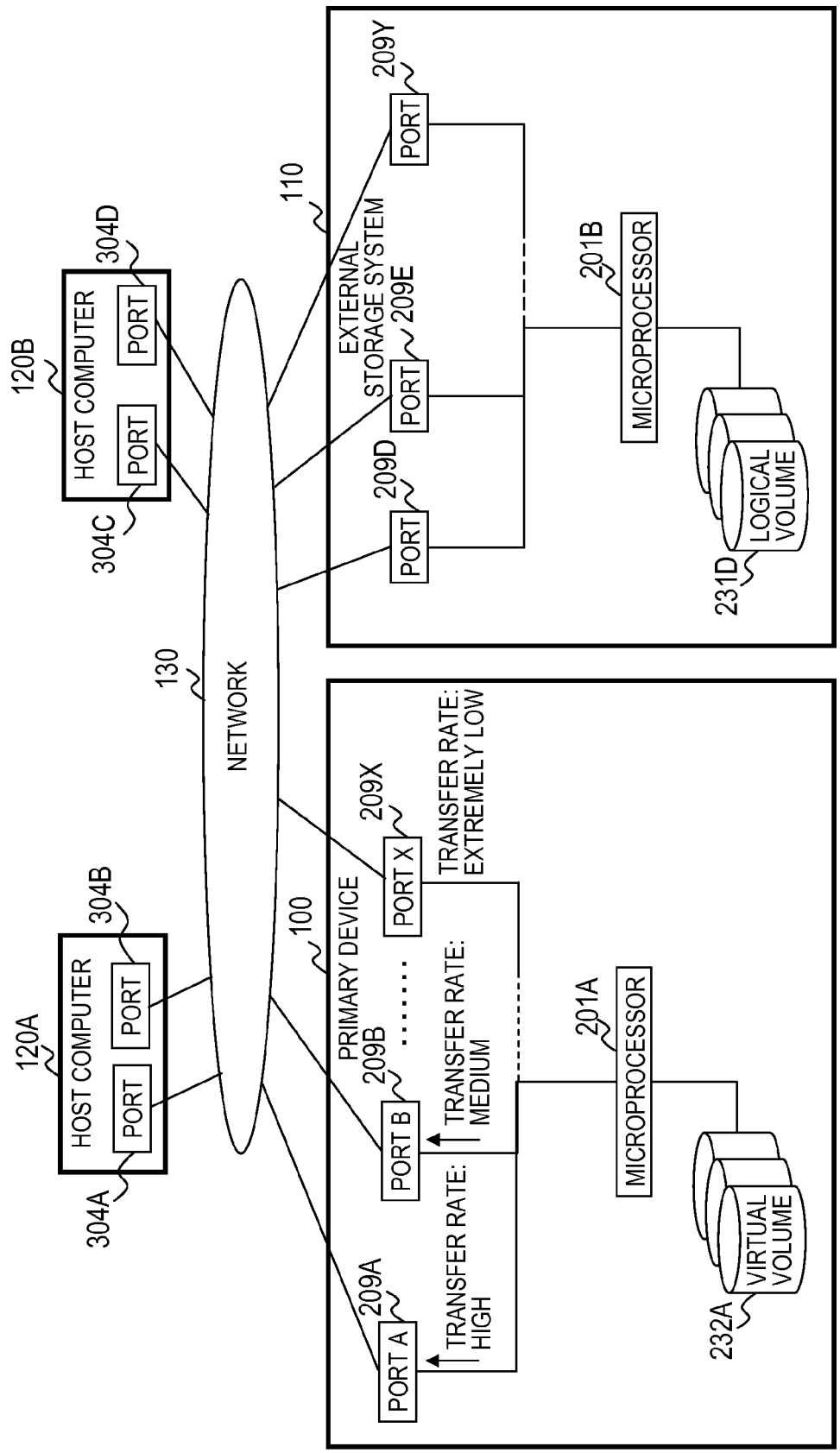
FIG. 22 is an explanatory diagram of data transfer executed by the storage system in a case where a communication rate control function is set to be inactive according to the second embodiment of this invention.

FIG. 22 is an explanatory diagram of data transfer executed by the storage system in a case where the communication rate control function is set to be inactive according to the second embodiment of this invention.

The data transfer shown in FIG. 22 is the same as the data transfer executed by the conventional storage system (in other words, to which this invention is not applied).

The host computer 120, the storage system 100, and the external storage system 110 of FIG. 22 are the same as those shown in FIGS. 3 and 15 through 17. However, in FIG. 22, the two ports 304 of the host computer 120B are referred to as ports 304C and 304D.

In FIG. 22, data written into the virtual volume 232A is transferred from the storage system 100 to the external storage system 110, and stored into the logical volume 231D. At this time, transfer units including the data are transmitted from the plurality of ports 209 including the ports 209A, 209B, and 209X in order.

For example, in a case where the transfer rate of the port 209A is relatively high with the transfer rate of the port 209B being lower than that and the transfer rate of the port 209X being extremely low, the transfer rates of the ports 209A and 209B are lowered under the influence of the transfer rate of the port 209X. This eliminates the advantage of using the plurality of ports to transfer data.

Figure 23:
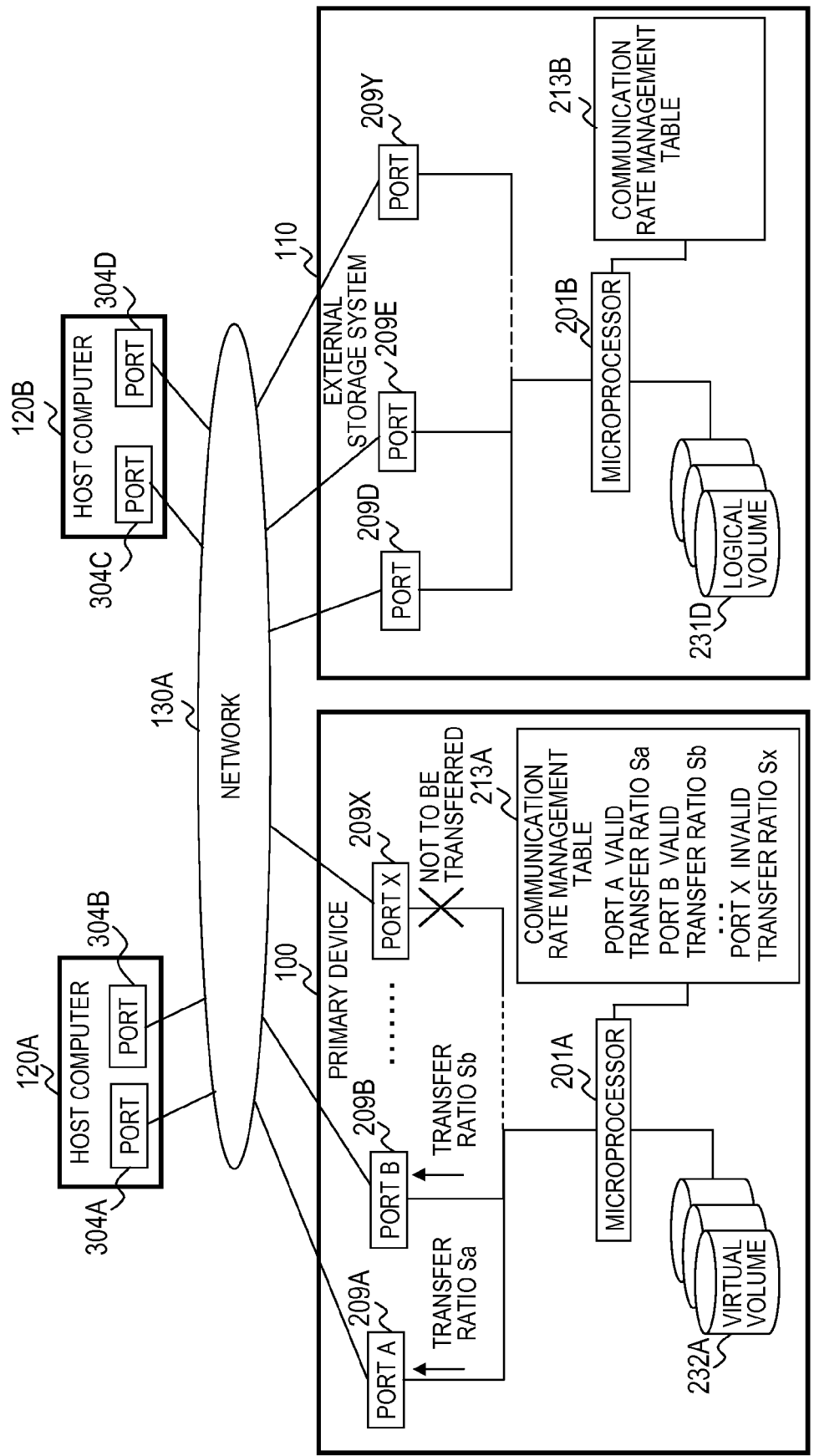
FIG. 23 is an explanatory diagram of the data transfer executed by the storage system in a case where the communication rate control function is set to be active according to the second embodiment of this invention.

FIG. 23 is an explanatory diagram of the data transfer executed by the storage system in a case where the communication rate control function is set to be active according to the second embodiment of this invention.

In the case where the communication rate control function is set to be active, the storage system 100 calculates the transfer ratio of each of the ports 209 as shown in Expression (2). For example, if the transfer ratio Sx of the port 209X becomes lower than a threshold value due to the extremely low transfer rate of the port 209X in the same manner as the case of FIG. 22, the storage system 100 does not use the port 209X for the data transfer. This can prevent the transfer rates of the other ports 209 from being lowered.

Further, data transmitted from the ports 209A and 209B have amounts according to their transfer ratios Sa and Sb, respectively. Accordingly, it is possible to effectively use the plurality of paths 402 without causing the path 402 having a low transfer rate to exert an influence on the transfer rates of the other paths 402.

INDUSTRIAL APPLICABILITY

This invention can be used for a storage system having a remote copy function or an external connection function.

The invention claimed is:

1. A storage system, comprising:
a storage medium for storing data;
a plurality of ports for connection to a network; and
a control section for controlling input of data to and output of data from the storage medium and transmission and reception of data via the plurality of ports, wherein:
the storage medium provides a storage area for storing data written by a computer;
the network is connected to another storage system;
the network includes a plurality of data transfer paths extending from the plurality of ports to the another storage system;
the plurality of ports include a first port, a second port, and a third port;
the plurality of data transfer paths include a first data transfer path extending from the first port to the another storage system, a second data transfer path extending from the second port to the another storage system, and a third data transfer path extending from the third port to the another storage system; and
the control section is configured to:
write, after receiving a request to write data into the storage area from the computer, data into the storage area; and
divide a copy of data written in the storage area into a plurality of transfer units, and transmit a request to write the plurality of transfer units from the plurality of ports to the another storage system, in an order of the received request;
acquire a time that elapses after each of the ports transmits the request to write the plurality of transfer units until receiving a response to the transmitted request from the another storage system;
calculate a response time of each of the data transfer paths by subtracting a time required for the another storage system to write the plurality of transfer units, which is included in the response, from the acquired time;
calculate a first ratio by dividing a mean value of the response times of the plurality of data transfer paths by the response time of the first data transfer path;
calculate a second ratio by dividing a mean value of the response times of the plurality of data transfer paths by the response time of the second data transfer path;
transmit, if the first ratio is smaller than a predetermined threshold value, the plurality of transfer units from the plurality of ports excluding the first port;
transmit, if the first ratio is larger than the predetermined threshold value and smaller than the second ratio, the plurality of transfer units from the plurality of ports so that a number of the transfer units transmitted from the first port is smaller than a number of the transfer units transmitted from the second port; and
transmit, if a failure occurs in the third data transfer path after the plurality of transfer units are transmitted from the plurality of ports excluding the first port, the plurality of transfer units from the plurality of ports which exclude the third port and include the first port.

2. A storage system configured to be coupled to a host computer and another storage system via a network, the storage system comprising:
a plurality of storage mediums for storing data;
a plurality of ports for connection to the network; and
a control section for managing a plurality of logical volumes on the storage medium, controlling a data transfer between the host computer and the plurality of logical volumes and a data transfer between the another storage system and the plurality of logical volumes, wherein:
the network includes a plurality of data transfer paths extending from the plurality of ports to the another storage system;
a first logical volume of the plurality of logical volume configures remote copy pairs with a second logical volume in the another storage system; and
the control section is configured to:
  transmit, in response to receiving a write request to the first logical volume from the host computer, data corresponding to the write request to the second logical volume in the another storage system using a first plurality of data transfer paths included in the plurality of data transfer paths;
  calculate a transfer ratio of each of the first plurality of data transfer paths based on comparison of respective transfer rates of each of the first plurality of data transfer paths with the transfer rates of other data transfer paths included in the first plurality of data transfer paths so that the transfer ratio indicates how high or low the respective transfer rate is for each of the first plurality of data transfer paths compared with the transfer rates of said other data transfer paths included in the first plurality of data transfer paths;
  suspend, if a certain data transfer path having a transfer ratio lower than predetermined threshold value is detected, the data transmission using the detected data transfer path; and
  transmit the data corresponding to the write request to the second logical volume in the another storage system using a first plurality of data transfer paths excluding the detected path in accordance with the round robin procedure.

3. The storage system according to claim 2,
wherein a first plurality of the ports includes a first port corresponding to one of the first plurality of data transfer paths having a low value of the transfer ratio and a second port corresponding to another one of the plurality of data transfer paths having a high value of the transfer ratio,
wherein the control section is configured to: divide the data corresponding to the write request into a plurality of transfer units; and transmit the plurality of transfer units from the first plurality of ports so that a number of the transfer units transmitted from the first port is smaller than a number of the transfer units transmitted from the second port.

4. The storage system according to claim 2,
wherein a first plurality of the ports includes a first port corresponding to one of the first plurality of data transfer paths having a low value of the transfer ratio and a second port corresponding to another one of the first plurality of data transfer paths having a high value of the transfer ratio,
wherein: the control section divides the data corresponding to the write request into a plurality of transfer units; the plurality of transfer units include a first transfer unit and a second transfer unit including more data than the first transfer unit; and the control section transmits the first transfer unit from the first port and transmits the second transfer unit from the second port.

5. The storage system according to claim 2,
wherein the transfer rate of each of the first plurality of data transfer paths extending from each of the ports to the another storage system is defined as a response time of each of the data transfer paths.

6. The storage system according to claim 5,
wherein the control section is configured to: transmit a request to write data into the another storage system from each of the ports; acquire a time that elapses after each of the ports transmits the request to write data until receiving a response to the transmitted request from the another storage system; and calculate the response time by subtracting a time required for the another storage system to write the data, which is included in the response, from the acquired time.

7. The storage system according to claim 5,
wherein the control section is configured to: transmit a request to write data into the another storage system from each of the ports; transmit, after receiving a response to the request to write data from the another storage system, a request to read the written data from each of the ports to the another storage system; and acquire a time that elapses after each of the ports transmits the request to read data until receiving a response to the request to read data from the another storage system, as the response time.

8. The storage system according to claim 2,
wherein performance of each of the data transfer paths extending from each of the ports to the another storage system is defined as a data transfer amount per unit time of each of the data transfer paths.

9. The storage system according to claim 2,
wherein the control section judges, if a proportion of the transfer rate of a certain one of the first data transfer paths to a mean value of the transfer rate of the first plurality of data transfer paths is smaller than the predetermined threshold value, that the transfer rate of the certain one of the first data transfer paths is lower than the predetermined threshold value.

10. The storage system according to claim 2,
wherein the control section is configured to transfer the data corresponding to the write request to the second logical volume in the another storage system using the first plurality of data transfer paths in accordance with a round robin procedure.

* * * * *